United States Patent
Nagaraja et al.

(10) Patent No.: US 11,606,158 B2
(45) Date of Patent: Mar. 14, 2023

(54) EVENT TRIGGERING AND REPORTING WITH MULTIPLE REFERENCE SIGNALS

(71) Applicant: QUALCOMM incorporated, San Diego, CA (US)

(72) Inventors: Sumeeth Nagaraja, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/873,658

(22) Filed: Jan. 17, 2018

(65) Prior Publication Data

US 2018/0205483 A1 Jul. 19, 2018

Related U.S. Application Data

(60) Provisional application No. 62/448,314, filed on Jan. 19, 2017.

(51) Int. Cl.
| | |
|---|---|
| *H04J 11/00* | (2006.01) |
| *H04L 5/00* | (2006.01) |
| *H04W 24/10* | (2009.01) |
| *H04B 7/06* | (2006.01) |
| *H04L 25/02* | (2006.01) |
| *H04W 72/04* | (2023.01) |

(Continued)

(52) U.S. Cl.
CPC ........ *H04J 11/0086* (2013.01); *H04B 7/0617* (2013.01); *H04B 7/0632* (2013.01); *H04B 17/309* (2015.01); *H04L 5/005* (2013.01); *H04L 5/0082* (2013.01); *H04W 24/10* (2013.01); *H04W 72/042* (2013.01); *H04J 11/0073* (2013.01); *H04J 11/0076* (2013.01); *H04L 25/0206* (2013.01); *H04W 36/30* (2013.01)

(58) Field of Classification Search
None
See application file for complete search history.

(56) References Cited

U.S. PATENT DOCUMENTS

2012/0021788 A1  1/2012  Yavuz et al.
2012/0127888 A1  5/2012  Fujishima et al.
(Continued)

FOREIGN PATENT DOCUMENTS

WO  WO-2015012663 A1  1/2015
WO  WO-2016160269 A1  10/2016

OTHER PUBLICATIONS

International Search Report and Written Opinion—PCT/US2018/014221—ISA/EPO—dated Jun. 18, 2018 (171737WO).

*Primary Examiner* — Yemane Mesfin
*Assistant Examiner* — Jeff Banthrongsack
(74) *Attorney, Agent, or Firm* — Holland & Hart LLP

(57) ABSTRACT

Methods, systems, and devices for wireless communication are described for event triggering and reporting with multiple reference signals. A user equipment (UE) may receive event configuration data that specifies at least one permitted combination of reference signals of different types for generating a signal quality comparison and receive a first reference signal and a second reference signal. The UE may generate signal quality comparison data based at least in part on the event configuration data, the first reference signal, and the second reference signal, and transmit a report to a base station that includes the signal quality comparison data.

28 Claims, 16 Drawing Sheets

(51) Int. Cl.
*H04B 17/309* (2015.01)
*H04W 36/30* (2009.01)

(56) References Cited

U.S. PATENT DOCUMENTS

| | | |
|---|---|---|
| 2013/0322277 A1 | 12/2013 | Vanganuru et al. |
| 2014/0073329 A1* | 3/2014 | Kang .................. H04W 36/14 455/439 |
| 2014/0328327 A1 | 11/2014 | Xiao et al. |
| 2015/0326335 A1* | 11/2015 | Chen .................... H04W 48/20 370/252 |
| 2016/0254886 A1* | 9/2016 | Bontu .................. H04L 5/0073 455/452.1 |
| 2016/0338118 A1 | 11/2016 | Vajapeyam et al. |

* cited by examiner

EVENT TRIGGERING AND REPORTING WITH MULTIPLE REFERENCE SIGNALS

CROSS REFERENCES

The present Application for Patent claims priority to U.S. Provisional Patent Application No. 62/448,314 by Nagaraj a, et al., entitled "Event Triggering and Reporting With Multiple Reference Signals," filed Jan. 19, 2017, assigned to the assignee hereof.

BACKGROUND

The following relates generally to wireless communication, and more specifically to event triggering and reporting with multiple reference signals.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

A wireless multiple-access communication system may include a number of base stations, each simultaneously supporting communication with one or more UEs. In an LTE or LTE-Advanced (LTE-A) network, a set of one or more base stations may define an eNodeB (eNB). In other examples (e.g., in a next generation, NR, or 5G network), a wireless multiple access communication system may include a number of smart radio heads (RHs) in communication with a number of access node controllers (ANCs), where a set of one or more radio heads, in communication with an ANC, may define an eNB. A base station or radio head may communicate with a set of UEs on downlink channels (e.g., for transmissions from a base station or radio head to a UE) and uplink channels (e.g., for transmissions from a UE to a base station or radio head). The term "base station" may be used herein to refer to either an LTE base station or a radio head.

Path loss is an issue for wireless communication systems. Path loss refers to a reduction in power density of an electromagnetic wave as it propagates. A degree of path loss between a base station or radio head and a UE may be informed by the use of reference signals. For example, a base station or a radio head may transmit a reference signal. A UE may make measurements of the transmitted reference signal and may determine a signal quality metric. The signal quality metric may be reported by the UE to the base station or radio head, thus informing the base station or radio head of a degree of path loss suffered by communications between the base station or radio head and the UE.

SUMMARY

The described techniques relate to improved methods, systems, devices, or apparatuses that support event triggering and reporting with multiple reference signals. Generally, the described techniques provide for a transmitter and a receiver to coordinate monitoring of signal quality measurements for beam management and mobility management to combat path loss. The receiver may receive multiple different reference signals, either from a same transmitter or different transmitters. The described techniques allow the receiver to use multiple different reference signals, including reference signals of different types, to determine signal quality measurements. A transmitter, such as a base station, may select an event configuration for instructing which combinations of reference signals a receiver, such as a UE, may measure for comparing signal quality. As different base stations may send different types of reference signals, notifying the UE of allowed reference signal combinations permits the UE to make meaningful signal quality comparisons using different types of reference signals. The UE may generate and send a report to the base station that includes a signal quality comparison. The base station may process the report to trigger events, such as for selecting which beam is to service the UE and/or whether to handover the UE to a different base station.

A method of wireless communication by a user equipment is described. The method may include receiving event configuration data that specifies at least one permitted combination of reference signals of different types for generating a signal quality comparison, receiving a first reference signal and a second reference signal, generating signal quality comparison data based at least in part on the event configuration data, the first reference signal, and the second reference signal, and transmitting a report to a base station that includes the signal quality comparison data.

An apparatus for wireless communication is described. The apparatus may include means for receiving event configuration data that specifies at least one permitted combination of reference signals of different types for generating a signal quality comparison, means for receiving a first reference signal and a second reference signal, means for generating signal quality comparison data based at least in part on the event configuration data, the first reference signal, and the second reference signal, and means for transmitting a report to a base station that includes the signal quality comparison data.

Another apparatus for wireless communication is described. The apparatus may include a processor, memory in electronic communication with the processor, and instructions stored in the memory. The instructions may be operable to cause the processor to receive event configuration data that specifies at least one permitted combination of reference signals of different types for generating a signal quality comparison, receive a first reference signal and a second reference signal, generate signal quality comparison data based at least in part on the event configuration data, the first reference signal, and the second reference signal, and transmit a report to a base station that includes the signal quality comparison data.

A non-transitory computer readable medium for wireless communication is described. The non-transitory computer-readable medium may include instructions operable to cause a processor to receive event configuration data that specifies at least one permitted combination of reference signals of different types for generating a signal quality comparison, receive a first reference signal and a second reference signal, generate signal quality comparison data based at least in part on the event configuration data, the first reference signal, and the second reference signal, and transmit a report to a base station that includes the signal quality comparison data.

Some examples of the method, apparatus, and non-transitory computer-readable medium described above may further include processes, features, means, or instructions for receiving a third reference signal. Some examples of the method, apparatus, and non-transitory computer-readable medium described above may further include processes, features, means, or instructions for deriving a combined signal quality level based at least in part on the first reference signal and the third reference signal, wherein generating the signal quality comparison data may be based at least in part on the combined signal quality level.

In some examples of the method, apparatus, and non-transitory computer-readable medium described above, deriving the combined signal quality level further comprises determining the combined signal quality level based at least in part on a function included in the event configuration data. In some examples of the method, apparatus, and non-transitory computer-readable medium described above, deriving the combined signal quality level further comprises determining the combined signal quality level using a predetermined number of reference signals identified in the event configuration data. In some examples of the method, apparatus, and non-transitory computer-readable medium described above, deriving the combined signal quality level further comprises determining the combined signal quality level using a reference signal that satisfies a threshold indicated in the event configuration data.

In some examples of the method, apparatus, and non-transitory computer-readable medium described above, generating the signal quality comparison data comprises comparing a first signal quality level associated with at least the first reference signal with a second signal quality level associated with at least the second reference signal.

Some examples of the method, apparatus, and non-transitory computer-readable medium described above may further include processes, features, means, or instructions for processing the event configuration data to determine a margin for the first reference signal or the second reference signal, wherein the generating of the signal quality comparison data may be based at least in part on the margin. In some examples of the method, apparatus, and non-transitory computer-readable medium described above, the margin may be a function of bandwidth, or sub-carrier spacing, or both.

In some examples of the method, apparatus, and non-transitory computer-readable medium described above, the first reference signal may be transmitted by the base station and the second reference signal may be transmitted by a second base station, and wherein transmitting the report may be to trigger handover of the user equipment from the base station to the second base station.

In some examples of the method, apparatus, and non-transitory computer-readable medium described above, the first reference signal may be associated with a first beam and the second reference signal may be associated with a second beam, and wherein transmitting the report may be to trigger beam switch of the user equipment from the first beam to the second beam. In some examples of the method, apparatus, and non-transitory computer-readable medium described above, the first beam may be transmitted by the base station and the second beam may be transmitted by a second base station.

In some examples of the method, apparatus, and non-transitory computer-readable medium described above, the first reference signal, the second reference signal, or both, may be a cell-specific reference signal or a user equipment-specific reference signal.

In some examples of the method, apparatus, and non-transitory computer-readable medium described above, the report comprises an identifier of at least the first reference signal and a signal quality level of at least the first reference signal. In some examples of the method, apparatus, and non-transitory computer-readable medium described above, the identifier includes a beam identifier, or a system frame number, or a subframe index, or a symbol index.

In some examples of the method, apparatus, and non-transitory computer-readable medium described above, the signal quality comparison may be a relative signal quality comparison. In some examples of the method, apparatus, and non-transitory computer-readable medium described above, the signal quality comparison may be an absolute signal quality comparison.

In some examples of the method, apparatus, and non-transitory computer-readable medium described above, the event configuration data includes a list of permitted combinations of reference signal types.

In some examples of the method, apparatus, and non-transitory computer-readable medium described above, receiving the event configuration data comprises processing radio resource control (RRC) signaling, layer 1 (L1) signaling, layer 2 (L2) signaling, or any combination thereof, to obtain the event configuration data. In some examples of the method, apparatus, and non-transitory computer-readable medium described above, receiving event configuration data comprises processing a synchronization signal block, or a control region, or a data region to obtain the event configuration data.

A method of wireless communication by a base station is described. The method may include selecting event configuration data that specifies at least one permitted combination of reference signals of different types for a signal quality comparison, transmitting the event configuration data to a user equipment, and receiving a report from a user equipment that includes signal quality comparison data generated based at least in part on the event configuration data.

An apparatus for wireless communication is described. The apparatus may include means for selecting event configuration data that specifies at least one permitted combination of reference signals of different types for a signal quality comparison, means for transmitting the event configuration data to a user equipment, and means for receiving a report from a user equipment that includes signal quality comparison data generated based at least in part on the event configuration data.

Another apparatus for wireless communication is described. The apparatus may include a processor, memory in electronic communication with the processor, and instructions stored in the memory. The instructions may be operable to cause the processor to select event configuration data that specifies at least one permitted combination of reference signals of different types for a signal quality comparison, transmit the event configuration data to a user equipment, and receive a report from a user equipment that includes signal quality comparison data generated based at least in part on the event configuration data.

A non-transitory computer readable medium for wireless communication is described. The non-transitory computer-readable medium may include instructions operable to cause a processor to select event configuration data that specifies at least one permitted combination of reference signals of different types for a signal quality comparison, transmit the event configuration data to a user equipment, and receive a report from a user equipment that includes signal quality comparison data generated based at least in part on the event configuration data.

Some examples of the method, apparatus, and non-transitory computer-readable medium described above may further include processes, features, means, or instructions for transmitting a reference signal to the user equipment.

Some examples of the method, apparatus, and non-transitory computer-readable medium described above may further include triggering a handover of the user equipment from the base station to the second base station based at least in part on the report. Some examples of the method, apparatus, and non-transitory computer-readable medium described above may further include triggering a beam switch of the user equipment from the first beam to the second beam.

Some examples of the method, apparatus, and non-transitory computer-readable medium described above may further include identifying a neighboring base station and signal quality comparison data of the neighboring base station based at least in part on the report.

In some examples of the method, apparatus, and non-transitory computer-readable medium described above, selecting the event configuration data comprises determining a margin for the user equipment to use for a first type of reference signal in a particular reference signal combination. In some examples of the method, apparatus, and non-transitory computer-readable medium described above, the margin may be a function of bandwidth associated with the first type of reference signal, or a sub-carrier spacing associated with the first type of reference signal, or both.

In some examples of the method, apparatus, and non-transitory computer-readable medium described above, the signal quality comparison data may be a comparison of a first signal quality level of a first reference signal transmitted by the base station relative to a second signal quality level of a second reference signal transmitted by a second base station.

In some examples of the method, apparatus, and non-transitory computer-readable medium described above, the signal quality comparison data may be a comparison of a first signal quality level of a first beam relative to a second signal quality level of a second beam. In some examples of the method, apparatus, and non-transitory computer-readable medium described above, the first beam may be transmitted by the base station and the second beam may be transmitted by a second base station.

DETAILED DESCRIPTION

Figure 1:
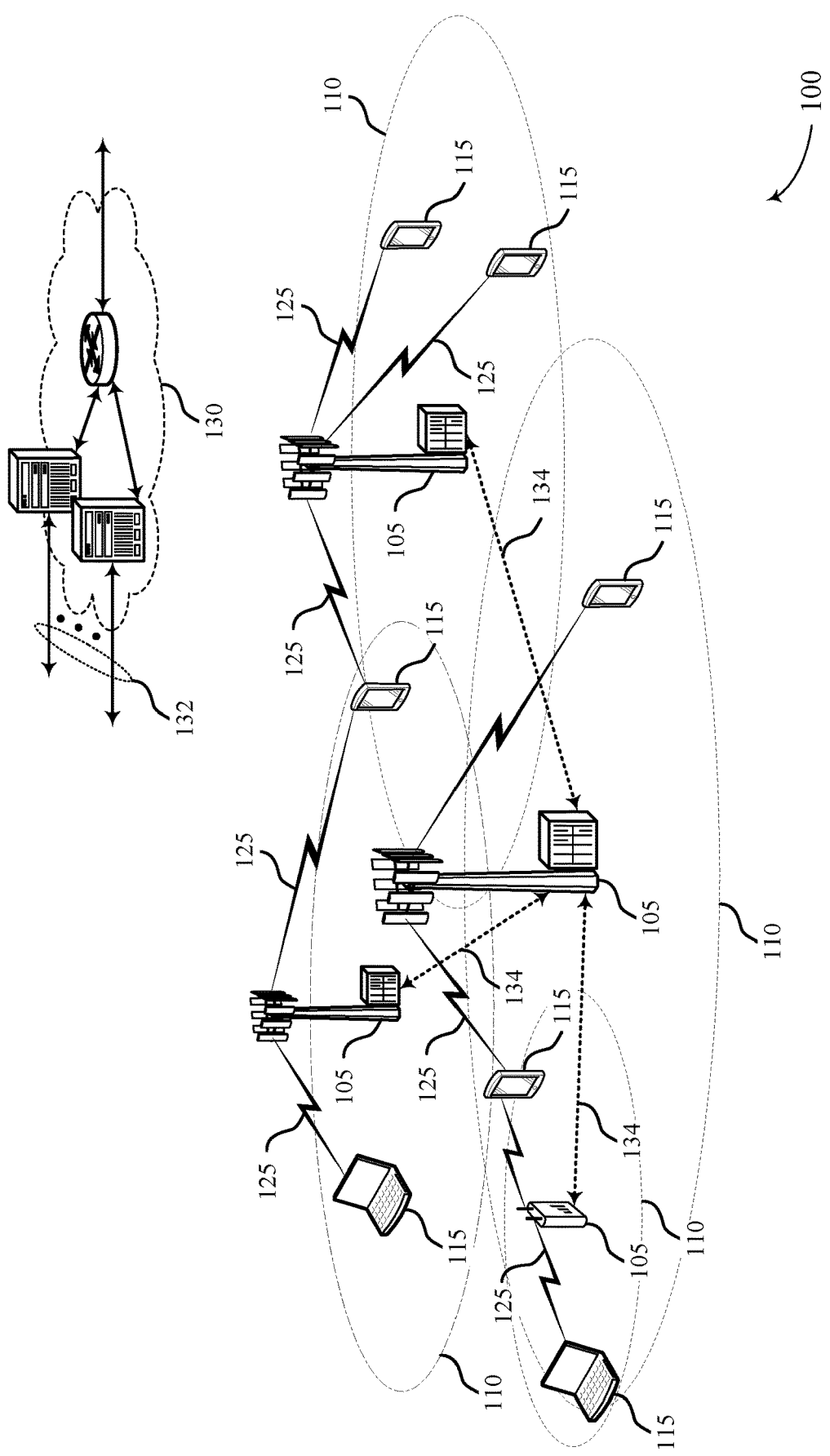
FIG. 1 illustrates an example of a system for wireless communication that supports event triggering and reporting with multiple reference signals in accordance with aspects of the present disclosure.

Techniques described herein provide for a transmitter and a receiver to coordinate monitoring of signal quality measurements for beam management and user equipment (UE) mobility management to combat path loss. Generally, the described techniques provide for a transmitter and a receiver to coordinate monitoring of signal quality measurements for beam management and UE mobility management to combat path loss. The receiver may receive multiple different reference signals, either from a same transmitter or different transmitters. The described techniques allow the receiver to use multiple different reference signals, including reference signals of different types, to determine signal quality measurements. A transmitter, such as a base station, may select an event configuration for instructing which combinations of reference signals a receiver, such as a UE, may measure for comparing signal quality. As different base stations may send different types of reference signals, notifying the UE of allowed reference signal combinations permits the UE to make meaningful signal quality comparisons using different types of reference signals. The UE may generate and send a report to the base station that includes a signal quality comparison. The base station may process the report to trigger events, such as for selecting which beam is to service the UE and/or whether to handover the UE to a different base station.

High path loss is a challenge in some wireless systems, and techniques such as analog and/or digital hybrid beamforming are used to combat path loss. In hybrid beamforming, a transmitter, such as a base station, uses an antenna array that focuses radiated electromagnetic energy into a beam in the direction of a receiver, such as a UE. Beamforming can enhance link budget and improve a signal to noise ratio (SNR) at the receiver.

In the examples described herein, a transmitter and a receiver may coordinate monitoring of signal quality measurements for beam management and UE mobility management to combat path loss. A base station may select an event configuration for instructing which combinations of reference signals the UE may measure for comparing signal quality. As different base stations may send different types of reference signals, notifying the UE of the reference signal combinations permits the UE to make meaningful signal quality comparisons using different types of reference signals. The UE may generate and send a report to the base station that includes a signal quality comparison. The base station may process the report to trigger events, such as for selecting which beam is to service the UE and/or whether to handover the UE to a different base station.

Aspects of the disclosure are initially described in the context of a wireless communications system. The wireless communication system may enable a transmitter and receiver to coordinate monitoring of signal quality measurements for beam management and UE mobility management to combat path loss. Aspects of the disclosure are further illustrated by and described with reference to apparatus diagrams, system diagrams, and flowcharts that relate to event triggering and reporting with multiple reference signals.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), an LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices.

A UE 115 may establish a connection with a base station 105, and beamforming techniques may be used to communicate with each other. As described herein, base station 105 may transmit event configuration data to the UE 115 to notify the UE 115 of allowed types of reference signal combinations (e.g., combinations of different types of reference signals that may be concurrently used by the UE 115). The UE 115 may calculate a signal quality level using the permitted types of reference signal combinations and generate signal quality comparison data in accordance with the event configuration data. The signal quality level may be, for example, a measurement of a reference signal received power (RSRP). The UE 115 may generate and send a report to the base station 105 that includes the signal quality comparison data. The base station may process the report to trigger events, such as for selecting which beam is to service the UE and/or whether to handover the UE to a different base station.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an 51 interface to the core network 130. The core network may be an evolved packet core (EPC), which may include at least one mobility management entity (MME), at least one serving gateway (S-GW), and at least one packet data network gateway (P-GW). The MME may be the control node that processes the signaling between the UE 115 and the EPC. All user Internet protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

The core network 130 may provide user authentication, access authorization, tracking, IP connectivity, and other access, routing, or mobility functions. At least some of the network devices, such as base station 105-a may include subcomponents such as an access network entity 105-b, which may be an example of an access node controller (ANC). Each access network entity 105-b may communicate with a number of UEs 115 through a number of other access network transmission entities 105-c, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra high frequency (UHF) frequency region using frequency bands from 700 MHz to 2600 MHz (2.6 GHz), although in some cases wireless local area networks (WLANs) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g. a base station 105) to shape and/or steer an overall antenna beam in the direction of a target receiver (e.g. a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g. a base station) and a receiver (e.g. a UE), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may use multiple antennas or antenna arrays to conduct beamforming operations for directional communications with a UE 115.

In the examples described herein, a base station 105 and a UE 115 may coordinate monitoring of signal quality measurements for beam management and UE mobility management to combat path loss. A base station 105 may select an event configuration for instructing which combinations of reference signals the UE 115 may measure for comparing signal quality. As different base stations may send different types of reference signals, notifying the UE 115 of the reference signal combinations permits the UE 115 to make meaningful signal quality comparisons using different types of reference signals. The UE 115 may generate and send a report to the base station that includes signal quality comparison data. The base station 105 may process the report to trigger events, such as for selecting which beam services the UE 115 and/or whether to handover the UE 115 to a different base station.

Figure 2:
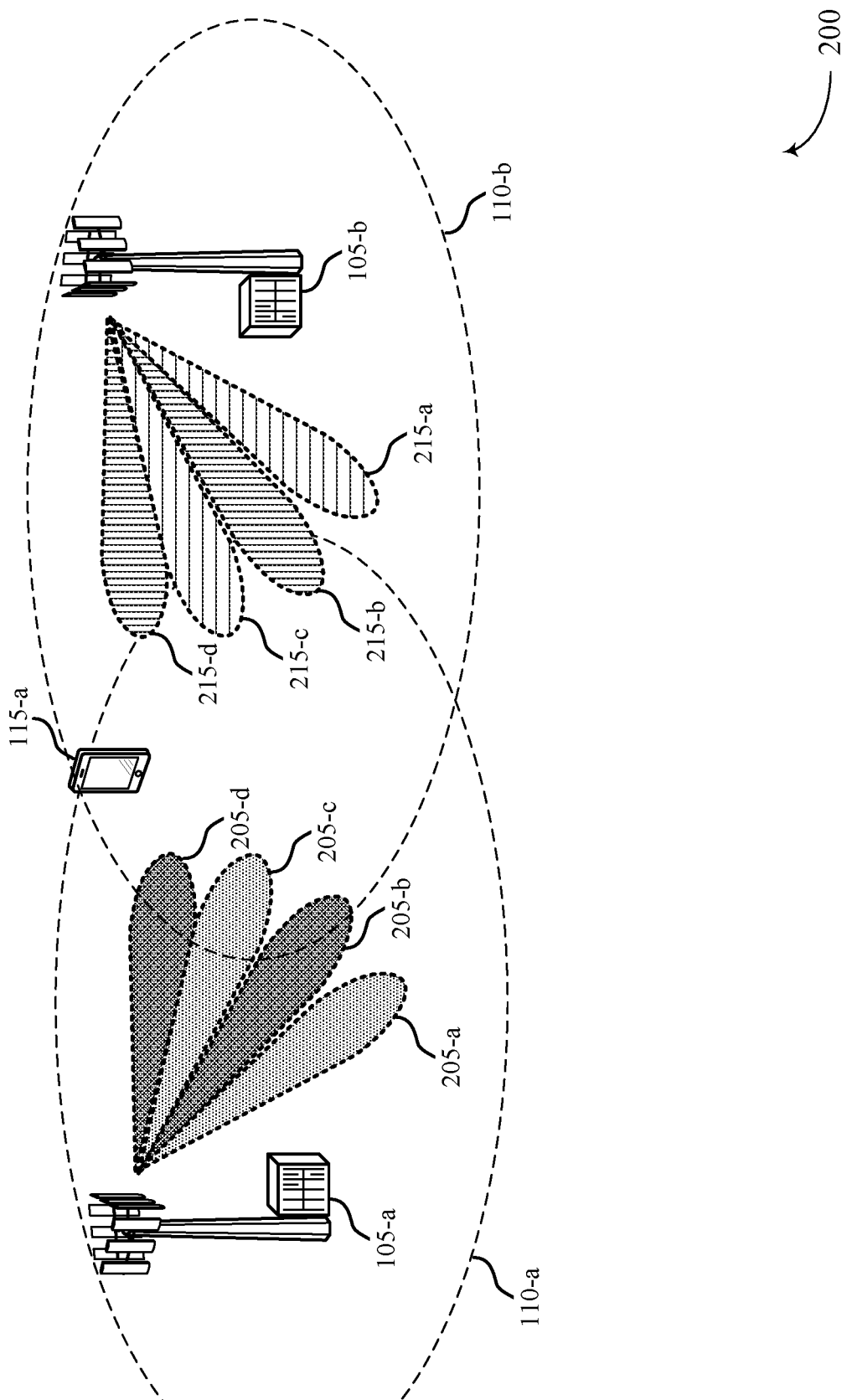
FIG. 2 illustrates an example of a wireless communication system that supports event triggering and reporting with multiple reference signals in accordance with aspects of the present disclosure.

FIG. 2 illustrates an example of a wireless communications system 200 that supports event triggering and reporting with multiple reference signals in accordance with various aspects of the present disclosure. Wireless communications system 200 may include base stations 105-a, 105-b having corresponding coverage areas 110-a, 110-b, and a UE 115-a within the coverage areas 110-a, 110-b. Each of base stations 105-a, 105-b and UE 115-a may be examples of the corresponding devices described with reference to FIG. 1. Base station 105-a, 105-b may communicate with UE 115-a using directional wireless transmissions referred to herein as beams (e.g., to account for path loss associated with operating in a mmW environment). In some cases (as illustrated), base station 105-a may communicate with UE 115-a using one of transmit directional beams 205-a, 205-b, 205-c, 205-d, while base station 105-b may also communicate with UE 115-a using one of transmit directional beams 215-a, 215-b, 215-c, 215-d. Wireless communications system 200 may include other base stations that may communicate with the UE 115-a.

Figure 3:
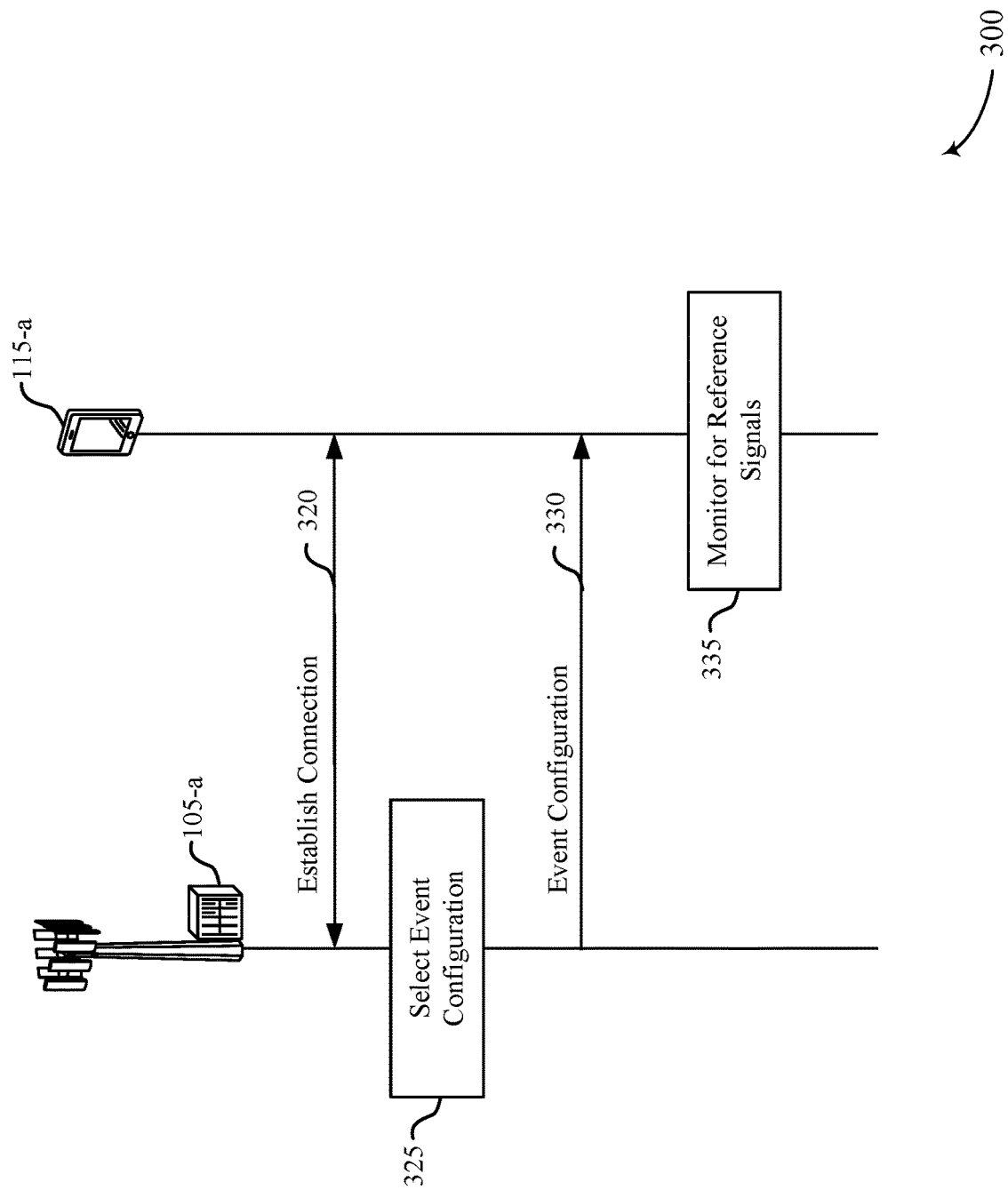
FIG. 3 illustrates an example of a process flowchart that supports event triggering and reporting with multiple reference signals in accordance with aspects of the present disclosure.

At some time, a UE 115-a may establish a connection with at least one of the base stations 105-a, 105-b and may receive event configuration data to enable beam management and/or UE mobility management. FIG. 3 illustrates an example of a process flowchart 300 that supports event triggering and reporting with multiple reference signals in accordance with various aspects of the present disclosure. At 320, the UE 115-a may, in the depicted example, establish a connection with base station 105-a to receive service. Base station 105-a may also be referred to as a serving base station or a serving new radio base station (NR BS).

At 325, the base station 105-a may select event configuration data to send to the UE 115-a. The event configuration data may instruct the UE 115-a what type or types of reference signals may be used to generate a signal quality comparison. A reference signal may be a signal having a known amplitude and phase that enables a receiver, such as UE 115, to estimate and make channel quality measurements of a beam or other wireless communication channel. A base station 105-a may transmit one or more types of reference signals. Examples of a reference signal include a multi-beam reference signal (MRS), a channel state information reference signal (CSI-RS), secondary synchronization signal (SSS), a new radio synchronization signal (NR-SS), or the like. In some examples, an eNB, such as base station 105-a, may configure different reference signal types for event triggering and indicate to the UE 115-a how to compare measurements for different reference signal types. In some examples, CSI-RS and SSS may be used for layer-3 (L3) mobility. A reference signal may also be a cell-specific reference signal, a UE specific reference signal, a reference signal specific to multiple UEs, or the like. A base station 105-a may periodically transmit a reference signal, may aperiodically transmit a reference signal, may transmit a reference signal once or a limited number of times, or the like.

A base station 105-a may transmit a reference signal within a block or particular region within available time-frequency resources. In an example, the base station 105-a may use time-frequency resources that have been divided into blocks for transmission and reception, where each block corresponds to a predetermined frequency range and time interval within the available time-frequency resources. In such a scenario, the base station 105-a may transmit a reference signal in one or more of the blocks. For example, the base station 105-*a* may transmit a reference signal in a new radio synchronization signal (NR-SS) block. In another example, some of the one or more blocks may be NR-SS blocks and others of the one or more blocks may be non-NR-SS blocks. In some instances, the base station 105-*a* may transmit a reference signal (e.g., the MRS) in a NR-SS block, in a non-NR-SS block, or in both. In other examples, a TTI may be defined within the available time-frequency resources and the TTI may be divided into a control region and a data region. The base station 105-*a* may transmit a reference signal in the control region, in the data region, or in both.

Because base stations may transmit one or more different types of resource signals, the base station 105-*a* may select event configuration data to enable the UE 115-*a* to make a meaningful signal quality comparison of the different types of resource signals. In an example, the event configuration data may specify that the signal quality comparison may be based at least in part on (1) reference signals of the same type, (2) reference signals of different types, or both. In some examples, the event configuration data may include a list of what combinations of reference signals types that are allowed for generating a signal quality comparison.

In some examples, the signal quality comparison may be a relative comparison or an absolute comparison. For a relative signal quality comparison, the UE 115-*a* may measure a signal quality level of different reference signals, and may determine, for example, a ratio to compare the measured signal quality levels to each other. The signal quality level may be, for example, a measurement of RSRP. For an absolute signal quality comparison, the UE 115-*a* may measure a signal quality level of different reference signals, and determine whether each of the measured signal quality levels satisfies a threshold (e.g., meets or exceeds the threshold).

The event configuration data may also specify a margin for a measurement of a reference signal of a particular type. The margin may be used to enable the UE 115-*a* to generate a meaningful comparison between reference signals of different types. There are a number of factors that may impact measurement of a signal quality level using a reference signal, including power level at which the reference signal is transmitted, bandwidth of the reference signal, and spacing of sub-carriers used to transport the reference signal, or the like. The margin may be used to remove any unwarranted benefit from these factors that would skew calculation of signal quality level of one type of reference signal as compared to another. In one example, the margin may be a scaling factor that scales a transmitted power level of each reference signal to the same power level. In another example, the margin may be a determination of a statistical metric (e.g., an average) of signal quality level over time (e.g., over 200 milliseconds). The statistical metric may be used to smooth out signal quality level variations that may occur, for example, in a reference signal transmitted over a narrow bandwidth. A bandwidth may be deemed narrow if it does not satisfy a threshold (e.g., equals or is less than a threshold).

In a further example, the margin may adjust for differences in spacing of sub-carriers used for transporting different reference signals. Sub-carrier spacing may be the reciprocal of a symbol duration and may be selected to avoid or mitigate blurring caused by Doppler shift and to maintain orthogonality between sub-carriers. As a center frequency of different spectrum bands increases, having a larger sub-carrier spacing may help mitigate phase noise experienced when communicating at higher frequencies. Accordingly, in some examples, different base stations may support spectrum bands having different sub-carrier spacings. While sub-carrier spacing may be predetermined for a subframe (e.g., depending on the spectrum band or type of signal to be transmitted), sub-carrier spacing may also vary throughout a subframe.

For instance, multiple transmission time intervals (TTIs) may span a subframe and control symbols (e.g., downlink control symbols or uplink control symbols) corresponding to the multiple TTIs may be divided into smaller symbol durations and transmitted at different locations within the subframe and/or according to different sub-carrier spacings. The margin may depend on the bandwidth, sub-carrier spacing, or the like, of the reference signals being compared for a signal quality determination. The margin may be selected to adjust for differences in spacing of sub-carriers used for transporting different reference signals.

In some examples, the event configuration may contain information, such as sub-carrier spacing, and the UE may use the information contained in the event configuration to determine a margin, if any. In another example, the UE may identify information, e.g., sub-carrier spacing, and use the identified information to determine a margin, if any. That is, the UE may determine a margin based at least in part on the event configuration, or the information already available at the UE, or both.

The margin may be used when calculating a relative and/or absolute signal quality comparison. For a relative signal quality comparison, the margin may be applied to a calculated signal quality level for one or both of the reference signals levels, and the margined signal quality level(s) may be used to generate the signal quality comparison data. In some examples, the event configuration may specify whether the relative signal quality comparison is based at least in part on (1) reference signals of the same type, (2) reference signals of different types, or both. The event configuration may specify a list of what combinations of reference signals types are allowed for generating a signal quality comparison.

In some examples, the UE 115-*a* may combine signal quality levels determined from multiple reference signals of the same or different type. For example, a combined signal quality level may be derived by as a function of a measured reference signal received power (RSRP) of a first reference signal and of a measured RSRP of a second reference signal (e.g. average RSRP, add each RSRP in linear or log domain, etc.).

If a signal quality comparison using different reference signal types is allowed, then the event configuration may specify a margin, if any, that may be added to a signal quality level determined from one or each of the reference signal types. For example, if relative or absolute signal quality comparison is to be generated from a NR-SS reference signal and a MRS reference signal, the event configuration may specify a first margin, if any, for a signal quality level determined from the NR-SS reference signal, and a second margin, if any, for a signal quality level determined from the MRS reference signal. The UE 115-*a* may generate a relative or absolute signal quality comparison based on the margined signal quality level determined from the NR-SS reference signal and the margined signal quality level determined from the MRS reference signal.

For example, a bandwidth associated with a NR-SS reference signal may be 36 MHz whereas a bandwidth associated with a MRS reference signal may range from 36 Hz to 400 MHz for 120 KHz SS block subcarrier spacing (SCS). Since the bandwidth associated with the MRS reference signal may be wider than the bandwidth associated with the NR-SS reference signal, a measured signal quality level determined from the MRS reference signal may be more accurate than a measured signal quality level determined from the NR-SS reference signal. A margin may be added to the signal quality level determined from the NR-SS reference signal to counteract a potentially large deviation resulting from the narrower bandwidth NR-SS reference signal (e.g., to bring the measured NR-SS reference signal quality level closer to its mean value).

For an absolute signal quality comparison, the margin may be applied to a measurement of the signal quality level using a particular type of reference signal, and the UE 115-*a* may determine whether the margined signal quality level satisfies a threshold.

The event configuration data may also specify a mechanism for processing multiple reference signals that represent the signal quality of a common beam or common channel. For example, a base station 105-*a* may transmit multiple reference signals, such as an MRS and an NR-SS, to a UE 115-*a* via a same beam or same channel. The UE 115-*a* may process each of the multiple reference signals for measuring a signal quality level of the beam or channel between UE 115-*a* and base station 105-*a*. In an example, the UE 115-*a* may calculate a first signal quality level using a first of the reference signals, and may calculate a second signal quality level using a second of the reference signals. The event configuration data may instruct the UE 115-*a* how to derive a combined signal quality level that is a function of two or more calculated signal quality levels.

In an example, the event configuration data may instruct the UE 115-*a* to generate a statistic metric (e.g., an average, a weighted average, a total, etc.) of the two or more calculated signal quality levels as the combined signal quality level for the common beam or channel. In another example, the event configuration data may instruct the UE 115-*a* to use a maximum or minimum of the two or more calculated signal quality levels as the combined signal quality level for the common beam or channel. In some instances, the event configuration data may limit which calculated signal quality levels may be used to generate the combined signal quality level for the common beam or channel. In an example, the event configuration data may limit calculation of the combined signal quality level to a predetermined number of the reference signals having the highest or lower calculated signal quality levels (e.g., reference signals corresponding to the N best signal quality levels).

At 330, the base station 105-*a* may transmit the event configuration data to the UE 115-*a*. In an example, the base station 105-*a* may transmit the event configuration data via RRC signaling, via layer 1 (L1) signaling, via layer 2 (L2) signaling, or the like.

At 335, the UE 115-*a* may monitor for reference signals for generating signal quality comparison data in accordance with the received event configuration data, as further described below in FIG. 4.

Figure 4:
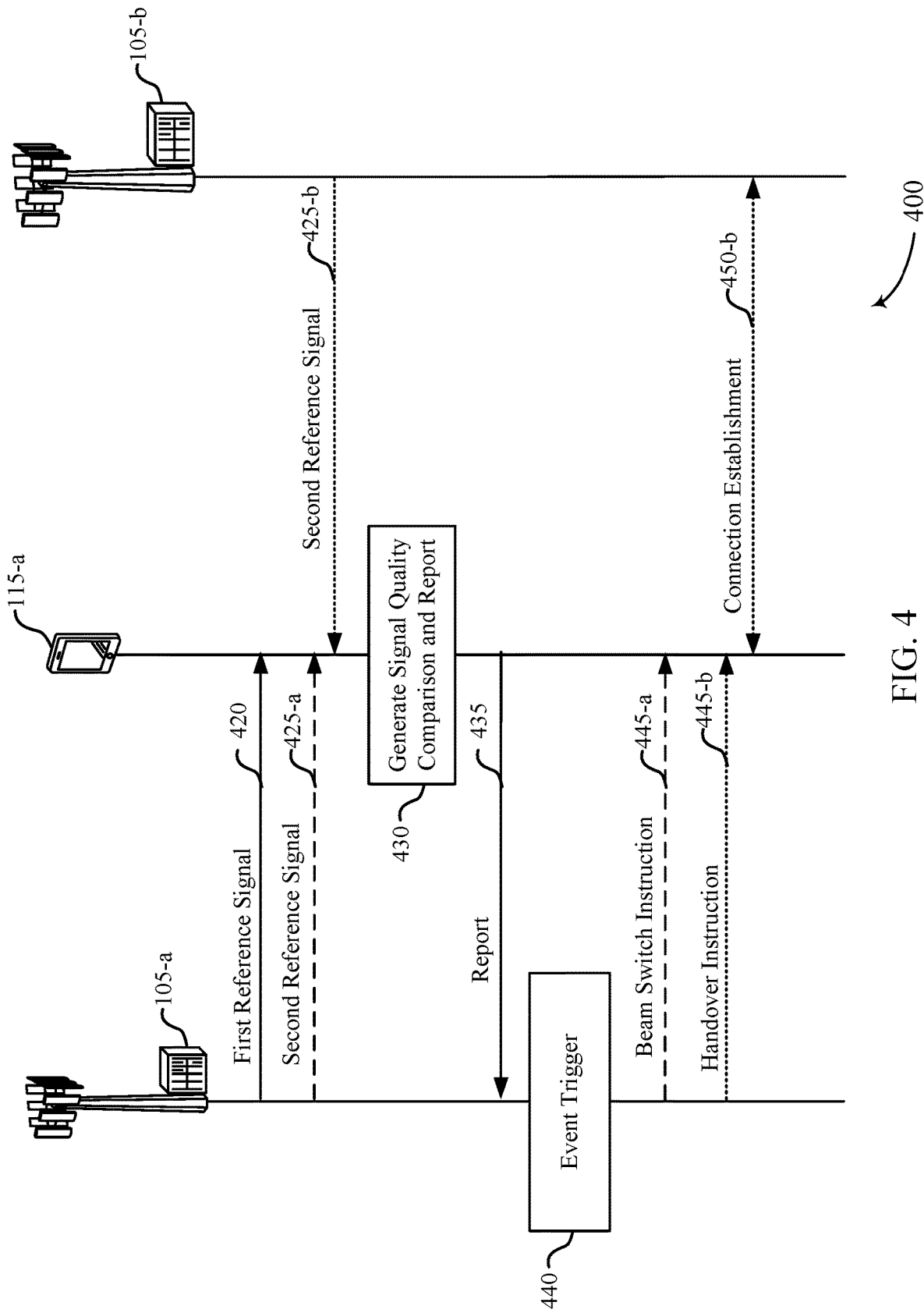
FIG. 4 illustrates an example of a process flowchart that supports event triggering and reporting with multiple reference signals in accordance with aspects of the present disclosure.

FIG. 4 illustrates an example of a process flowchart 400 that supports event triggering and reporting with multiple reference signals in accordance with various aspects of the present disclosure. At 420, the base station 105-*a* may transmit one or more reference signals to UE 115-*a* via one or more beams. The reference signal may be a MRS, a NR-SS, a SSS, a CSI-RS, or the like. In beam management, the UE 115-*a* may measure signal quality levels of multiple beams transmitted from a same base station. The base station 105-*a* may use beam management to determine that an appropriate beam of multiple available beams to use for transmission to the UE 115-*a*. In UE mobility management, the UE 115-*a* may measure signal quality levels of multiple beams transmitted from two or more base stations. The base station 105-*a* may use UE mobility management to determine both an appropriate beam of multiple available beams and an appropriate base station of multiples base station to use for communicating with the UE 115-*a*. The discussion below regarding 425-*a* and 445-*a* corresponds to beam management and is shown using a dashed line of a first type. The discussion below regarding 425-*b*, 445-*b*, and 450-*b* corresponds to UE mobility management and is shown using a dashed line of a second type. Beam management and UE mobility management may be performed simultaneously, in overlapping time intervals, or in distinct time intervals.

At 425-*a*, the base station 105-*a* may transmit one or more reference signals to UE 115-*a*. The one or more reference signals transmitted at 425-*a* may be sent using a different beam, or multiple different beams, than the beam used to transmit the one or more reference signals at 420. The UE 115-*a* may calculate signal quality measurements using each of the transmitted reference signals for calculating a signal quality comparison for beam management, as described below.

At 425-*b*, a second base station 105-*b* may transmit one or more reference signals to UE 115-*a* using one or more beams. The second base station may also be referred to as a target base station as it is a potential handover target for the UE 115-*a*. The UE 115-*a* may calculate signal quality measurements using each of the transmitted reference signals from each base station for calculating a signal quality comparison for UE mobility management, as described below. It is noted that only a second base station is depicted, however, any number of base stations may transmit one or more reference signals to UE 115-*a* using one or more beams.

At 430, the UE 115-*a* may generate signal quality comparison data and a report that includes the signal quality comparison data for transmission to the base station 105-*a*. To do so, the UE 115-*a* may determine what types of reference signals have been received, and process the event configuration data to determine allowed combinations of reference signal types that may be used to generate signal quality comparison data. The UE 115-*a* may calculate signal quality levels for the permitted reference signal types, and may generate signal quality comparison data using the calculated signal quality levels. The UE 115-*a* may also process the event configuration data to determine what margin(s), if any, to use when generating the signal quality comparison data, as described above. Further, the UE 115-*a* may process the event configuration data to determine what function(s) to use when generating a combined signal quality level using multiple calculated signal quality measurements for a common beam.

In a beam management scenario for any combination of reference signal types permitted by the event configuration data, the UE 115-*a* may use a first reference signal transmitted by base station 105-*a* in a first beam to calculate a first signal quality level of the first beam, and may use a second reference signal transmitted by base station 105-*a* in a second beam to calculate a second signal quality level of the second beam. If more than one reference signals is sent via a same beam, the UE 115-*a* may calculate a combined signal quality level as specified by the event configuration data in the manner described above. Also, a base station 105-*a* may transmit one or more reference signals using more than two beams, and the UE 115-*a* may calculate a signal quality level (or a combined signal quality level) corresponding to each beam as specified by the event configuration data.

In a UE mobility management scenario for any combination of reference signal types permitted by the event configuration data, the UE 115-*a* may use a first reference signal transmitted by base station 105-*a* in a first beam to calculate a first signal quality level of the first beam, and may use a second reference signal transmitted by a second base station 105-*b* in a second beam to calculate a second signal quality level of the second beam. If more than one reference signal is sent via a same beam, the UE 115-*a* may calculate a combined signal quality level as specified by the event configuration data in the manner described above. Also, each of base stations 105-*a*, 105-*b* may transmit one or more reference signals using more than two beams, and the UE 115-*a* may calculate a signal quality level (or a combined signal quality level) corresponding to each beam as specified by the event configuration data. Signal quality levels may also be determined for other target base stations.

The UE 115-*a* may generate signal quality comparison data using the calculated signal quality levels, including any combined signal quality levels.

To generate the relative signal quality comparison data, the UE 115-*a* may, in an example, determine a ratio between sets of two calculated signal quality levels. To generate relative signal quality comparison data, the UE 115-*a* may use a first signal quality level (e.g., of a reference signal of a first beam transmitted by the base station 105-*a*) as the numerator in the ratio and a signal quality level of (e.g., of a reference signal of one of the other beams) as the denominator. The relative signal quality comparison data may include multiple ratios where each ratio is a comparison of the first signal quality level to a signal quality level corresponding to a reference signal of one of the other beams. In another example, the relative signal quality comparison data may indicate which reference signal of one or more beams have a signal quality level that exceeds the first signal quality level, or that exceed the first signal quality level by at least a predetermined amount (e.g., by at least 10%).

To generate absolute signal quality comparison data, the UE 115-*a* may determine whether the first signal quality level satisfies a threshold (e.g., meets or exceeds the threshold). The UE 115-*a* may also determine whether a signal quality level corresponding to a reference signal for each of the other beams satisfies the threshold. The absolute signal quality comparison data may identify if the first signal quality level of the first beam satisfies the threshold, and which, if any, of the other beams has a signal quality level that satisfies the threshold.

At 435, the UE 115-*a* may transmit the report to base station 105-*a*. In some examples, the report may include a reference signal identifier (e.g., a unique identifier of the reference signal) of some or all of the beams and a calculated signal quality for some or all of the beams. In some examples, the reference signal identifier may include a beam identifier of the beam over which the reference signal was transmitted, a system frame number used to transmit the reference signal, a subframe index used to transmit the reference signal, a symbol index identifying a particular symbol period of a set of symbol periods of a subframe, or the like, or any combination thereof.

In some instances, the UE 115-*a* may transmit the report to trigger an event. In a beam management example, the base station 105-*a* may use the signal quality comparison data to determine whether to perform a beam switch to change which beam serves the UE 115-*a*. For example, the UE 115-*a* may send the report to trigger a beam switch from the first beam transmitted by base station 105-*a* to a second beam transmitted by base station 105-*a*. In a UE mobility management example, the base station 105-*a* may use the signal quality comparison data to determine which beam and which base station should serve the UE 115-*a*. For example, the UE 115-*a* may send the report to trigger a handover of the UE 115-*a* from a first beam transmitted by base station 105-*a* to a second beam transmitted by the second base station 105-*a*.

In some examples, a SS block index may be contained in a PBCH, and the UE 115-*a* in a connected mode may not be able to decode the PBCH of a target base station 105-*b*. Hence, UE 115-*a* may be unable to determine which SS block transports one or more reference signals of the target base station 105-*b*. To address this issue, the event configuration may specify a beam identifier, a system frame number, a subframe index, a symbol index, or the like, or any combination thereof, of a reference signal of the target base station 105-*b* that the UE 115-*a* is to measure. The UE 115-*a* may map the beam identifier, the system frame number, the subframe index, the symbol index, or any combination thereof, of the reference signal to an identifier of the target base station 105-*b*. The report generated by the UE 115-*a* may include the identifier of the target base station 105-*b* and the beam identifier, the system frame number, the subframe index, the symbol index, or any combination thereof, of the reference signal of the target base station 105-*b*. Thus, based at least in part on the report, the base station 105-*a* may know which reference signal was measured and which base station sent the measured reference signal, and the base station 105-*a* may process the report to determine whether to trigger an event (e.g., whether a handover is necessary).

The following provides examples of calculating signal quality levels for determining whether to trigger an event. In an example, base station 105-*a* may transmit NR-SS and MRS-1 (e.g., MRS multiplexed with NR-SS) at 420 and base station 105-*b* may transmit NR-SS, but not MRS-1, at 425-*b*. The UE 115-*a* may calculate a first signal quality level using NR-SS from base station 105-*a*, a second signal quality level using MRS-1 from base station 105-*a*, and a third signal quality level using NR-SS from the second base station 105-*b*. In one example, the event configuration data may instruct the UE 115-*a* to calculate signal quality levels using reference signals of a same type. For example, the UE 115-*a* may compare the first signal quality level and the third signal quality level, and may send a report to trigger a handover of the UE 115-*a* from base station 105-*a* to the second base station 105-*b* if, for example, the third signal quality level exceeds the first signal quality level (e.g., by at least a predetermined amount).

In another example, the event configuration data may instruct the UE 115-*a* to calculate signal quality levels using a particular combination of reference signal types. Here, the combination is MRS and NR-SS. In this example, the UE 115-*a* may compare the second signal quality level and the third signal quality level. Because different types of reference signals are being compared, the UE 115-*a* may determine whether there is any applicable margin to apply when calculating the signal quality comparison data. The UE 115-*a* may send a report to trigger a handover of the UE 115-*a* from base station 105-*a* to the second base station 105-*b* if, for example, the third signal quality level exceeds the second signal quality level (e.g., by at least a predetermined amount).

In another example, base station 105-a may transmit NR-SS at 420 and base station 105-b may transmit NR-SS and MRS-1 (e.g., MRS multiplexed with NR-SS) at 425-b. The UE 115-a may calculate a first signal quality level using NR-SS from base station 105-a, a second signal quality level using NR-SS from the second base station 105-b, and a third signal quality level using MRS-1 from the second base station 105-b. In one example, the event configuration data may instruct the UE 115-a to calculate signal quality levels using reference signals of a same type. For example, the UE 115-a may compare the first signal quality level and the second signal quality level. The UE 115-a may send a report to a base station 105-a including a signal quality comparison, and may trigger a handover of the UE 115-a from base station 105-a to the second base station 105-b if, for example, the second signal quality level exceeds the first signal quality level (e.g., by at least a predetermined amount).

In another example, the event configuration data may instruct the UE 115-a to calculate signal quality levels using a particular combination of reference signal types. Here, the combination is MRS and NR-SS. In this example, the UE 115-a may compare the first signal quality level and the third signal quality level. Because different types of reference signals are being compared, the UE 115-a may determine whether there is any applicable margin to apply when calculating the signal quality comparison data. The UE 115-a may send a report to trigger a handover of the UE 115-a from base station 105-a to the second base station 105-b if, for example, the third signal quality level exceeds the first signal quality level (e.g., by at least a predetermined amount).

In a similar manner, signal quality determinations using reference signals of a same or different types may be used for beam management. The UE 115-a may send a report to trigger a beam switch of the UE 115-a from first beam of the base station 105-a to a second beam of the base station 105-a if, for example, a signal quality level of the second beam exceeds the signal quality level of the first beam (e.g., by at least a predetermined amount).

At 440, the base station 105-a may determine whether an event trigger is satisfied. In some instances, the base station 105-a may perform a beam switch of the UE 115-a to a different beam transmitted by base station 105-a or to a beam transmitted by the second base station 105-b as indicated in the report. In some instances, the base station 105-a may process the report and the signal quality comparison data to independently determine whether to permit a beam switch to a different beam transmitted by base station 105-a or a handover to a beam transmitted by the second base station 105-b as indicated in the report. If the base station 105-a disagrees, the base station 105-a may transmit a message to the UE 115-a indicating that the requested handover is not being performed.

At 445-a, the base station 105-a may transmit a beam switch instruction to the UE 115-a. The beam switch instruction may inform the UE 115-a of information for communicating with the base station 105-a via a different beam. Operation 445-a is optional and may be skipped.

At 445-b, the base station 105-a may transmit a handover instruction to the UE 115-a. The handover instruction may, in some examples, indicate that a requested handover is not being performed. In other examples, the handover instruction may include information to enable the UE 115-a to perform a handover to a different beam available from the second base station 105-a.

At 450-b, the UE 115-a may initiate connection establishment with the second base station 105-b if instructed to do so at 445-b. The second base station 105-b may also coordinate with the base station 105-a to retrieve information, such as a context of the UE, to facilitate the handover. After the handover, the second base station 105-b becomes the serving base station for the UE 115-a. Operations 445-b and 450-b are optional and may be skipped.

The operations shown in FIGS. 3-4 may be performed in other orders, may be repeated one or more times, and selected operations may be skipped.

Advantageously, a base station may configure a UE to measure reference signals of the same or different types to make a meaningful signal quality comparison of reference signals of different types. The base station may coordinate with the UE in beam management and UE mobility management to trigger a beam switch of the UE to a different beam available from the base station and/or to trigger a handover of the UE to a beam available from a different base station.

Figure 5:
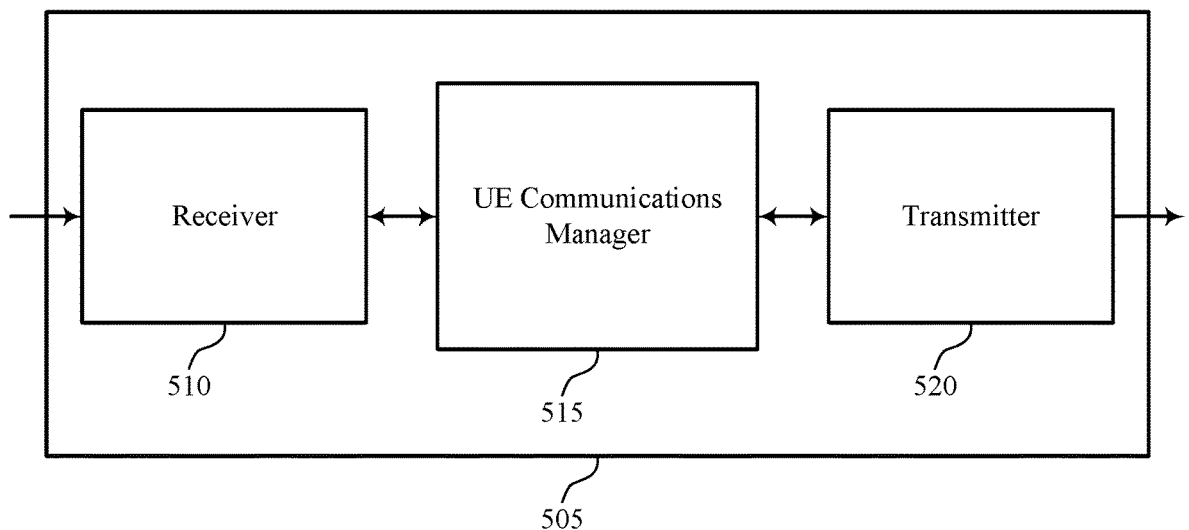
FIGS. 5 through 7 show block diagrams of a device that supports event triggering and reporting with multiple reference signals in accordance with aspects of the present disclosure.

FIG. 5 shows a block diagram 500 of a device 505 that supports event triggering and reporting with multiple reference signals in accordance with aspects of the present disclosure. Wireless device 505 may be an example of aspects of a UE 115, UE 115-a as described with reference to FIGS. 1-4. Wireless device 505 may include receiver 510, UE communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to event triggering and reporting with multiple reference signals, etc.). Information may be passed on to other components of the device. The receiver 510 may be an example of aspects of the transceiver 835 described with reference to FIG. 8.

In some examples, receiver 510 may receive event configuration data that specifies at least one permitted combination of reference signals of different types for generating a signal quality comparison, and receive a first reference signal, a second reference signal, and a third reference signal. In some cases, receiving the event configuration data includes processing RRC signaling, L1 signaling, L2 signaling, or any combination thereof, to obtain the event configuration data. In some cases, receiving event configuration data includes processing a synchronization signal block, or a control region, or a data region to obtain the event configuration data.

UE communications manager 515 may be an example of aspects of the UE communications manager 715 described with reference to FIG. 7.

UE communications manager 515 and/or at least some of its various sub-components may be implemented in hardware, software executed by a processor, firmware, or any combination thereof. If implemented in software executed by a processor, the functions of the UE communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 515 and/or at least some of its various sub-components may be physically located at various positions, including being distributed such that portions of functions are implemented at different physical locations by one or more physical devices. In some examples, UE communications manager 515 and/or at least some of its various sub-components may be a separate and distinct component in accordance with various aspects of the present disclosure. In other examples, UE communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 515 may receive event configuration data that specifies at least one permitted combination of reference signals of different types for generating a signal quality comparison, receive a first reference signal and a second reference signal, generate signal quality comparison data based at least in part on the event configuration data, the first reference signal, and the second reference signal, and transmit a report to a base station that includes the signal quality comparison data. In some cases, the first reference signal is transmitted by a first base station and the second reference signal is transmitted by a second base station. In some cases, the first reference signal is associated with a first beam and the second reference signal is associated with a second beam. In some cases, the signal quality comparison is a relative signal quality comparison or an absolute signal quality comparison.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may include a single antenna, or it may include a set of antennas.

In some examples, transmitter 520 may transmit a report to a base station that includes the signal quality comparison data. In some cases, transmitting the report is to trigger handover of the user equipment from the base station to a second base station. In some cases, transmitting the report is to trigger beam switch of the user equipment from a first beam to a second beam. In some cases, the first beam is transmitted by the base station and the second beam is transmitted by a second base station. In some cases, the report includes an identifier of the first reference signal and a signal quality level of the first reference signal. In some cases, the identifier includes a beam identifier, or a system frame number, or a subframe index, or a symbol index, or any combination thereof.

Figure 6:
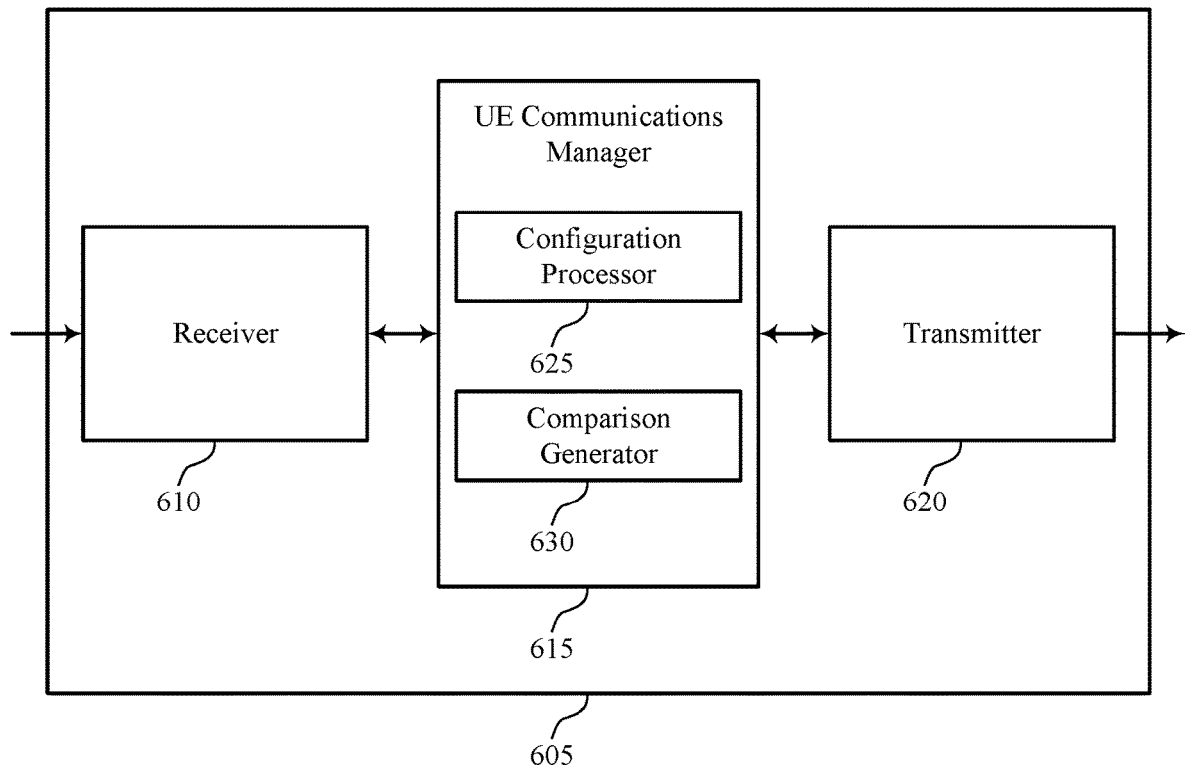

FIG. 6 shows a block diagram 600 of a device 605 that supports event triggering and reporting with multiple reference signals in accordance with aspects of the present disclosure. Wireless device 605 may be an example of aspects of a wireless device 505 or a UE 115 as described with reference to FIGS. 1 and 5. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to event triggering and reporting with multiple reference signals, etc.). Information may be passed on to other components of the device. The receiver 610 may be an example of aspects of the transceiver 835 described with reference to FIG. 8.

UE communications manager 615 may be an example of aspects of the UE communications manager 715 described with reference to FIG. 7.

UE communications manager 615 may also include Configuration Processor 625 and Comparison Generator 630.

Configuration Processor 625 may receive event configuration data that specifies at least one permitted combination of reference signals of different types for generating a signal quality comparison, receive a first reference signal and a second reference signal, and process a synchronization signal block, or a control region, or a data region to obtain the event configuration data. In some cases, receiving the event configuration data includes: processing radio resource control (RRC) signaling, layer 1 (L1) signaling, layer 2 (L2) signaling, or any combination thereof, to obtain the event configuration data.

Comparison Generator 630 may generate signal quality comparison data based on the event configuration data, the first reference signal, and the second reference signal and transmit a report to a base station that includes the signal quality comparison data. In some cases, generating the signal quality comparison data includes: comparing a first signal quality level associated with at least the first reference signal with a second signal quality level associated with at least the second reference signal. In some cases, the first reference signal is transmitted by the base station and the second reference signal is transmitted by a second base station, and where transmitting the report is to trigger handover of the user equipment from the base station to the second base station. In some cases, the first reference signal is associated with a first beam and the second reference signal is associated with a second beam, and where transmitting the report is to trigger beam switch of the user equipment from the first beam to the second beam. In some cases, the first beam is transmitted by the base station and the second beam is transmitted by a second base station.

In some cases, the first reference signal, the second reference signal, or both, are a cell-specific reference signal or a user equipment-specific reference signal. In some cases, the report includes an identifier of at least the first reference signal and a signal quality level of at least the first reference signal, where the identifier includes a beam identifier, or a system frame number, or a subframe index, or a symbol index, or any combination thereof. In some cases, the signal quality comparison is a relative signal quality comparison or an absolute signal quality comparison. In some cases, the event configuration data includes a list of permitted combinations of reference signal types.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
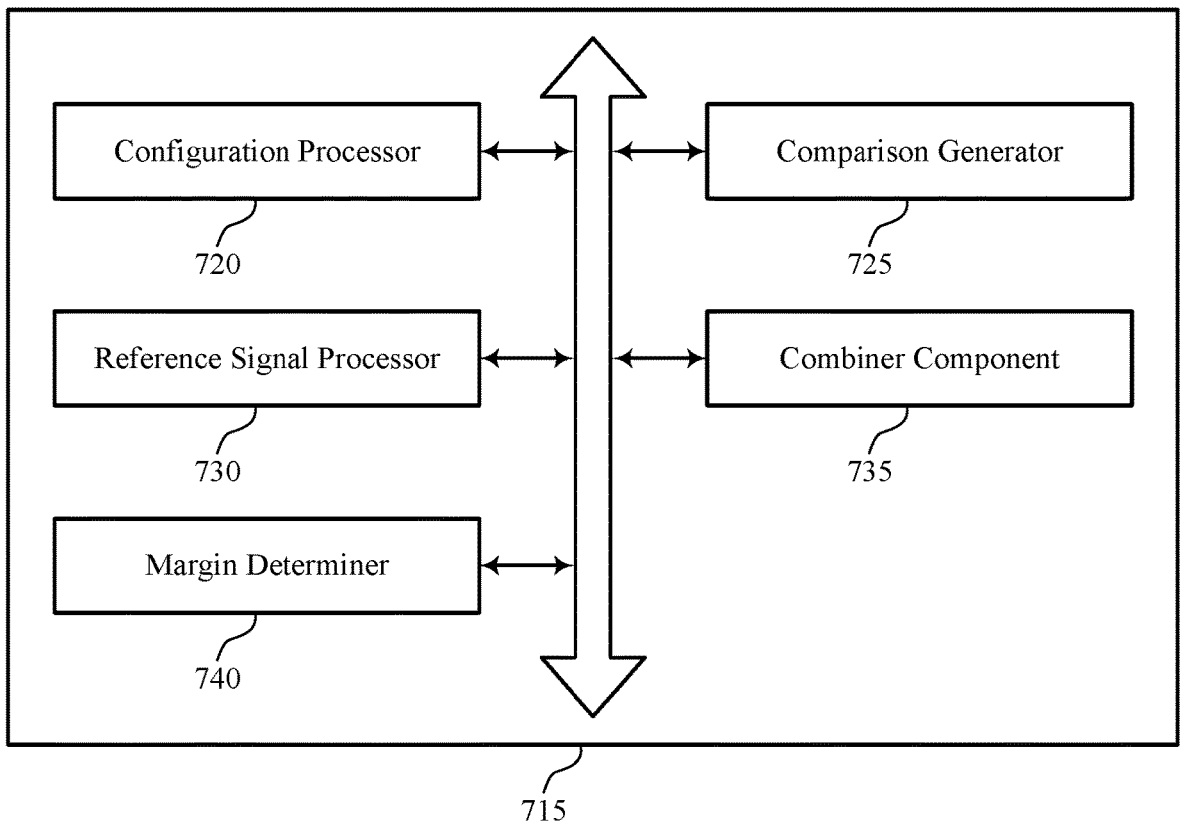

FIG. 7 shows a block diagram 700 of a UE wireless communications manager 715 that supports event triggering and reporting with multiple reference signals in accordance with aspects of the present disclosure. The UE communications manager 715 may be an example of aspects of a UE communications manager 515, a UE communications manager 615, or a UE communications manager 815 described with reference to FIGS. 5, 6, and 8. The UE communications manager 715 may include Configuration Processor 720, Comparison Generator 725, Reference Signal Processor 730, Combiner Component 735, and Margin Determiner 740. Each of these modules may communicate, directly or indirectly, with one another (e.g., via one or more buses).

Configuration Processor 720 may receive event configuration data that specifies at least one permitted combination of reference signals of different types for generating a signal quality comparison, receive a first reference signal and a second reference signal, and process a synchronization signal block, or a control region, or a data region to obtain the event configuration data. In some cases, receiving the event configuration data includes: processing RRC signaling, layer 1 (L1) signaling, layer 2 (L2) signaling, or any combination thereof, to obtain the event configuration data.

Comparison Generator 725 may generate signal quality comparison data based on the event configuration data, the first reference signal, and the second reference signal and transmit a report to a base station that includes the signal quality comparison data. In some cases, generating the signal quality comparison data includes: comparing a first signal quality level associated with at least the first reference signal with a second signal quality level associated with at least the second reference signal.

In some cases, transmitting the report is to trigger handover of the user equipment from the base station to the second base station. In some cases, the first reference signal is associated with a first beam and the second reference signal is associated with a second beam, and where transmitting the report is to trigger beam switch of the user equipment from the first beam to the second beam. In some cases, the first beam is transmitted by the base station and the second beam is transmitted by a second base station. In some cases, the report includes an identifier of at least the first reference signal and a signal quality level of at least the first reference signal, where the identifier includes a beam identifier, or a system frame number, or a subframe index, or a symbol index, or any combination thereof. In some cases, the signal quality comparison is a relative signal quality comparison or an absolute signal quality comparison. In some cases, the event configuration data includes a list of permitted combinations of reference signal types.

Reference Signal Processor 730 may receive the first, second, and/or third reference signal. In some cases, the first reference signal, the second reference signal, the third reference signal, or any combination thereof, are a cell-specific reference signal or a user equipment-specific reference signal. In some cases, the first reference signal is transmitted by the base station and the second reference signal is transmitted by a second base station.

Combiner Component 735 may derive a combined signal quality level based on the first reference signal and the third reference signal, where generating the signal quality comparison data is based on the combined signal quality level. In some cases, deriving the combined signal quality level further includes at least one of: determining the combined signal quality level based on a function included in the event configuration data, determining the combined signal quality level using a predetermined number of reference signals identified in the event configuration data, or determining the combined signal quality level using a reference signal that satisfies a threshold indicated in the event configuration data.

Margin Determiner 740 may process the event configuration data to determine a margin for the first reference signal or the second reference signal, where the margin is a function of bandwidth, or sub-carrier spacing, or both, and where the generating of the signal quality comparison data is based on the margin.

Figure 8:
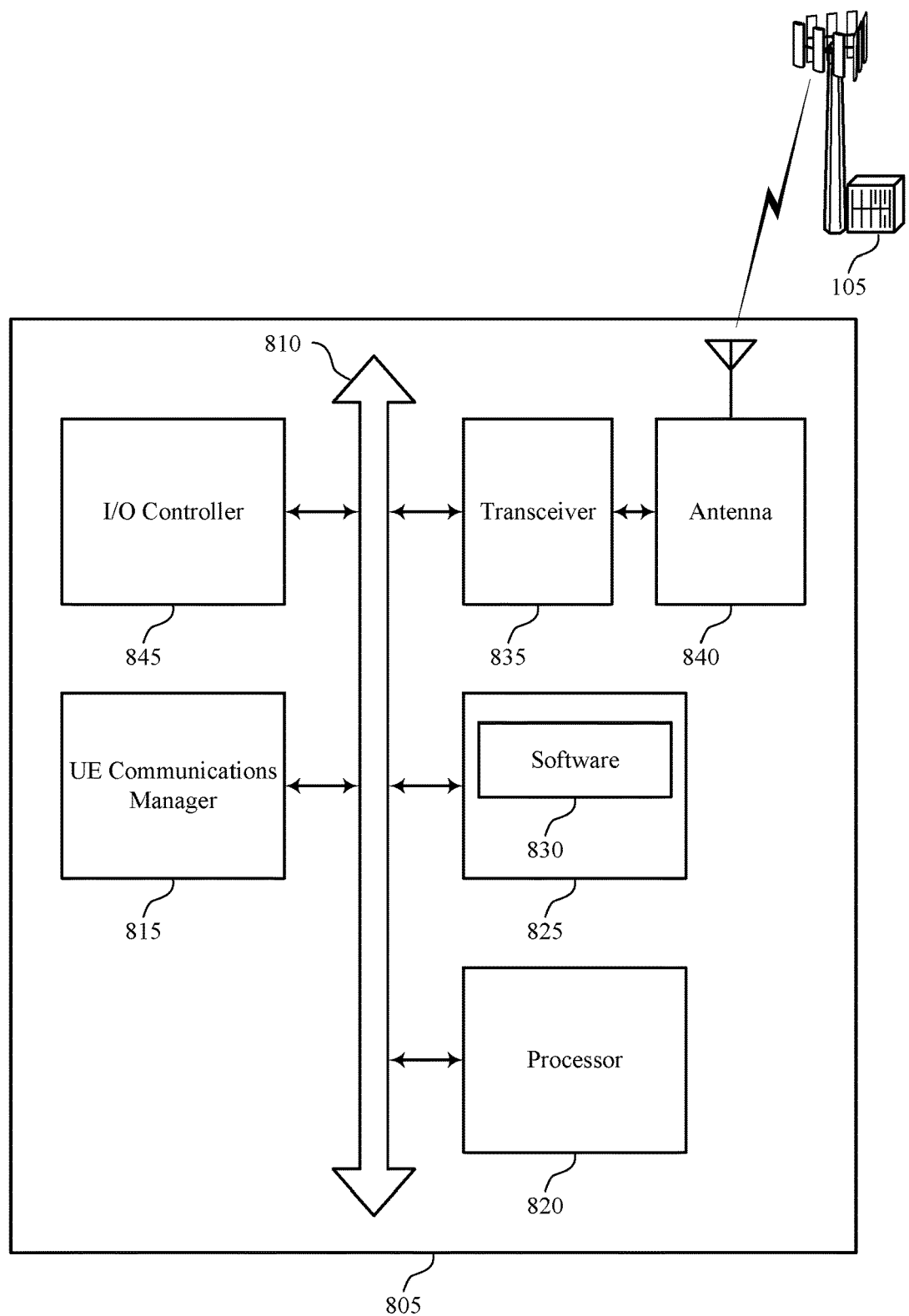
FIG. 8 illustrates a block diagram of a system including a user equipment (UE) that supports event triggering and reporting with multiple reference signals in accordance with aspects of the present disclosure.

FIG. 8 shows a diagram of a system 800 including a device 805 that supports event triggering and reporting with multiple reference signals in accordance with various aspects of the present disclosure. Device 805 may be an example of or include the components of device 505, device 605, or a UE 115 as described above, e.g., with reference to FIGS. 5 and 6. Device 805 may include components for bi-directional voice and data communications including components for transmitting and receiving communications, including UE wireless communications manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting event triggering and reporting with multiple reference signals).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support event triggering and reporting with multiple reference signals. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
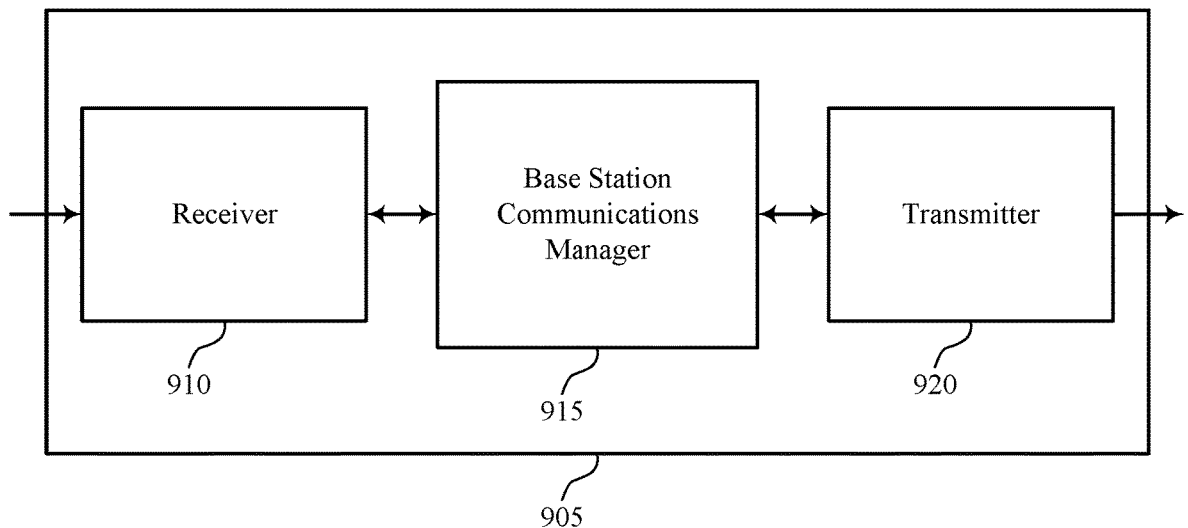
FIGS. 9 through 11 show block diagrams of a device that supports event triggering and reporting with multiple reference signals in accordance with aspects of the present disclosure.

FIG. 9 shows a block diagram 900 of a device 905 that supports event triggering and reporting with multiple reference signals in accordance with aspects of the present disclosure. Device 905 may be an example of aspects of a base station 105 as described herein. Device 905 may include receiver 910, base station wireless communications manager 915, and transmitter 920. Device 905 may also include a processor. Each of these components may be in communication with one another (e.g., via one or more buses).

Receiver 910 may receive information such as packets, user data, or control information associated with various information channels (e.g., control channels, data channels, and information related to event triggering and reporting with multiple reference signals, etc.). Information may be passed on to other components of the device. The receiver 910 may be an example of aspects of the transceiver 1235 described with reference to FIG. 12. The receiver 910 may utilize a single antenna or a set of antennas.

Base station wireless communications manager 915 may be an example of aspects of the base station wireless communications manager 1215 described with reference to FIG. 12.

Base station wireless communications manager 915 and/or at least some of its various sub-components may be implemented in hardware, software executed by a processor, firmware, or any combination thereof. If implemented in software executed by a processor, the functions of the base station wireless communications manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station wireless communications manager 915 and/or at least some of its various sub-components may be physically located at various positions, including being distributed such that portions of functions are implemented at different physical locations by one or more physical devices. In some examples, base station wireless communications manager 915 and/or at least some of its various sub-components may be a separate and distinct component in accordance with various aspects of the present disclosure. In other examples, base station wireless communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station wireless communications manager 915 may select event configuration data that specifies at least one permitted combination of reference signals of different types for a signal quality comparison, transmit the event configuration data to a user equipment, and receive a report from the user equipment that includes signal quality comparison data generated based on the event configuration data.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
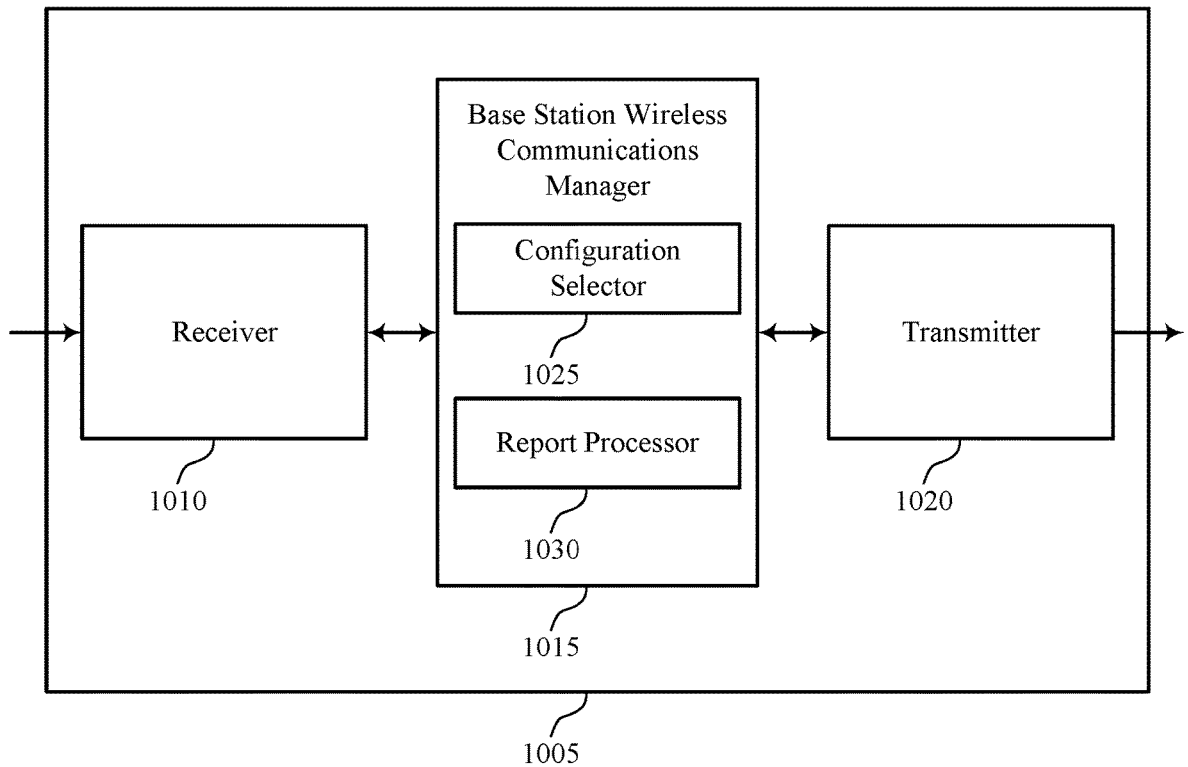

FIG. 10 shows a block diagram 1000 of a device 1005 that supports event triggering and reporting with multiple reference signals in accordance with aspects of the present disclosure. Device 1005 may be an example of aspects of a device 905 or a base station 105 as described with reference to FIG. 9. Device 1005 may include receiver 1010, base station wireless communications manager 1015, and transmitter 1020. Device 1005 may also include a processor. Each of these components may be in communication with one another (e.g., via one or more buses).

Receiver 1010 may receive information such as packets, user data, or control information associated with various information channels (e.g., control channels, data channels, and information related to event triggering and reporting with multiple reference signals, etc.). Information may be passed on to other components of the device. The receiver 1010 may be an example of aspects of the transceiver 1235 described with reference to FIG. 12. The receiver 1010 may utilize a single antenna or a set of antennas.

Base station wireless communications manager 1015 may be an example of aspects of the base station wireless communications manager 1215 described with reference to FIG. 12.

Base station wireless communications manager 1015 may also include Configuration Selector 1025 and Report Processor 1030.

Configuration Selector 1025 may select event configuration data that specifies at least one permitted combination of reference signals of different types for a signal quality comparison and transmit the event configuration data to a user equipment. In some cases, selecting the event configuration data includes: determining a margin for the user equipment to use for a first type of reference signal in a particular reference signal combination, where the margin is a function of bandwidth associated with the first type of reference signal, or a sub-carrier spacing associated with the first type of reference signal, or both.

Report Processor 1030 may receive a report from the user equipment that includes signal quality comparison data generated based on the event configuration data, and identify a neighboring base station and signal quality comparison data of the neighboring base station based on the report. In some cases, the report includes an identifier of at least a first reference signal and a signal quality level of at least the first reference signal, where the identifier includes a beam identifier, or a system frame number, or a subframe index, or a symbol index, or any combination thereof. In some cases, the signal quality comparison data is a comparison of a first signal quality level of a first reference signal transmitted by the base station relative to a second signal quality level of a second reference signal transmitted by a second base station. In some cases, Report Processor 1030 may trigger a handover of the user equipment from the base station to a second base station based on the report.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may include a single antenna, or it may include a set of antennas.

Figure 11:
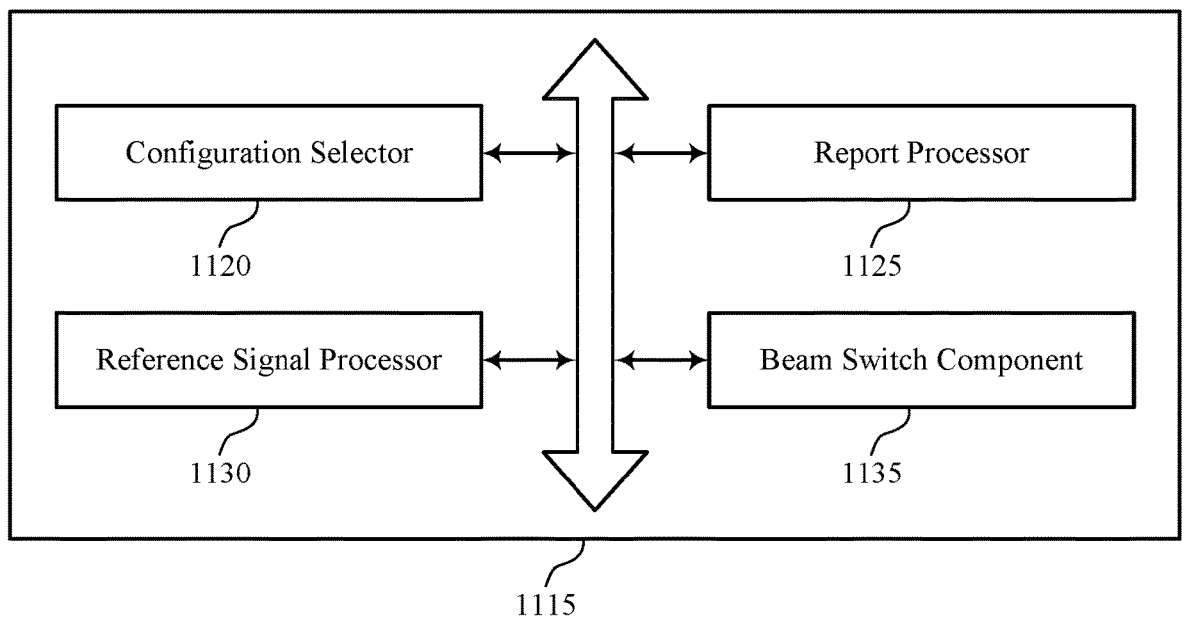

FIG. 11 shows a block diagram 1100 of a base station wireless communications manager 1115 that supports event triggering and reporting with multiple reference signals in accordance with aspects of the present disclosure.

The base station wireless communications manager 1115 may be an example of aspects of a base station wireless communications manager 1215 described with reference to FIGS. 9, 10, and 12. The base station wireless communications manager 1115 may include Configuration Selector 1120, Report Processor 1125, Reference Signal Processor 1130, and Beam Switch Component 1135. Each of these modules may communicate, directly or indirectly, with one another (e.g., via one or more buses).

Configuration Selector 1120 may select event configuration data that specifies at least one permitted combination of reference signals of different types for a signal quality comparison and transmit the event configuration data to a user equipment. In some cases, selecting the event configuration data includes: determining a margin for the user equipment to use for a first type of reference signal in a particular reference signal combination, where the margin is a function of bandwidth associated with the first type of reference signal, or a sub-carrier spacing associated with the first type of reference signal, or both.

Report Processor 1125 may receive a report from the user equipment that includes signal quality comparison data generated based on the event configuration data, and identify a neighboring base station and signal quality comparison data of the neighboring base station based on the report. In some cases, the report includes an identifier of at least a first reference signal and a signal quality level of at least the first reference signal, where the identifier includes a beam identifier, or a system frame number, or a subframe index, or a symbol index, or any combination thereof. In some cases, the signal quality comparison data is a comparison of a first signal quality level of a first reference signal transmitted by the base station relative to a second signal quality level of a second reference signal transmitted by a second base station. In some cases, Report Processor 1125 may trigger a handover of the user equipment from the base station to the second base station based on the report.

Reference Signal Processor 1130 may transmit a reference signal to the user equipment.

Beam Switch Component 1135 may trigger a beam switch of the user equipment from a first beam to a second beam. In some cases, the first beam is transmitted by the base station and the second beam is transmitted by a second base station. In some cases, the signal quality comparison data is a comparison of a first signal quality level of the first beam relative to a second signal quality level of the second beam.

Figure 12:
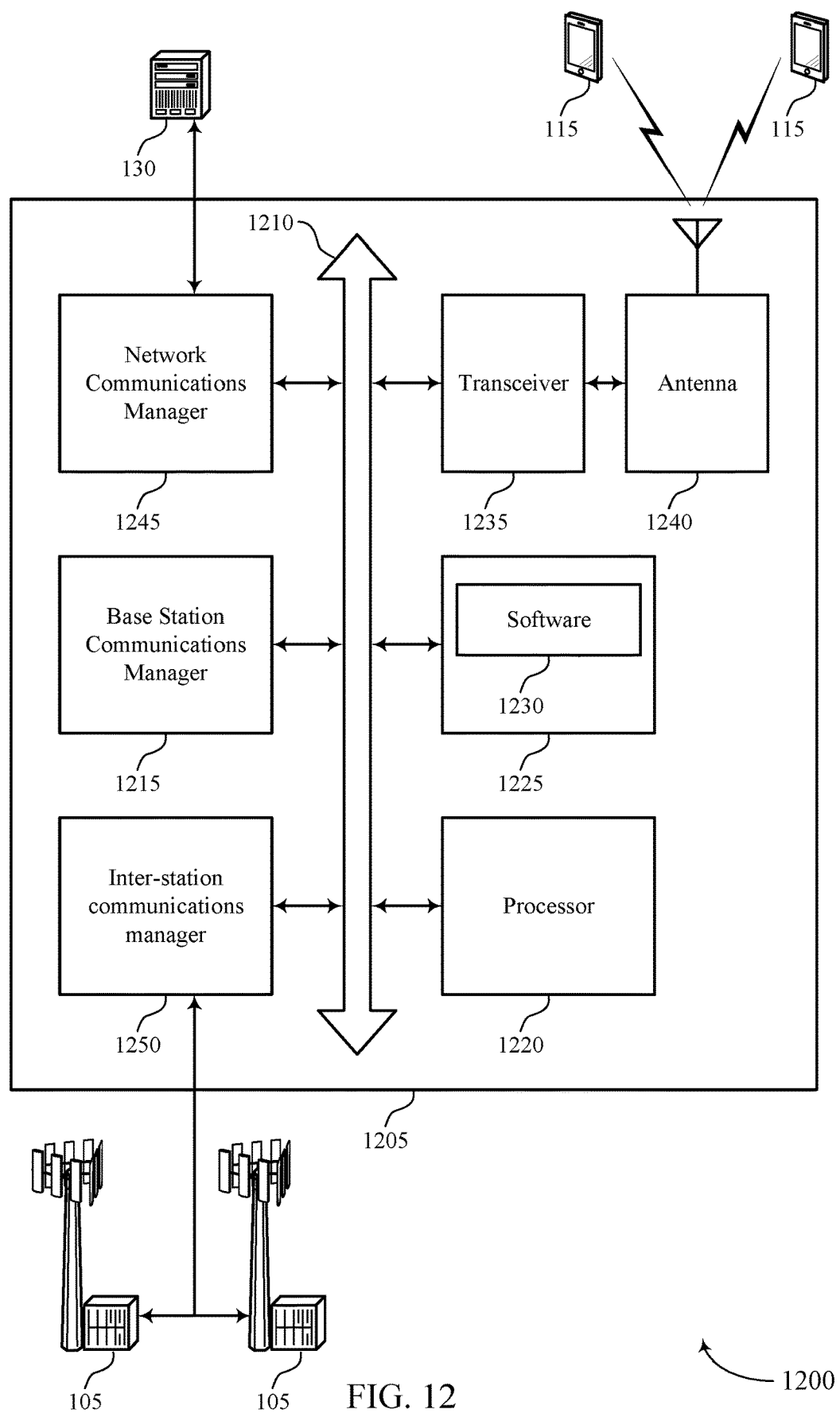
FIG. 12 illustrates a block diagram of a system including a base station that supports event triggering and reporting with multiple reference signals in accordance with aspects of the present disclosure.

FIG. 12 shows a diagram of a system 1200 including a device 1205 that supports event triggering and reporting with multiple reference signals in accordance with aspects of the present disclosure. Device 1205 may be an example of or include the components of base station 105 as described above, e.g., with reference to FIG. 1. Device 1205 may include components for bi-directional voice and data communications including components for transmitting and receiving communications, including base station wireless communications manager 1215, processor 1220, memory 1225, software 1230, transceiver 1235, antenna 1240, network communications manager 1245, and inter-station communications manager 1250. These components may be in electronic communication via one or more buses (e.g., bus 1210). Device 1205 may communicate wirelessly with one or more UEs 115.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting event triggering and reporting with multiple reference signals).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support event triggering and reporting with multiple reference signals. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Inter-station communications manager 1250 may manage communications with other base station 105, and may include a controller or scheduler for controlling communications with UEs 115 in cooperation with other base stations 105. For example, the inter-station communications manager 1250 may coordinate scheduling for transmissions to UEs 115 for various interference mitigation techniques such as beamforming or joint transmission. In some examples, inter-station communications manager 1250 may provide an X2 interface within an Long Term Evolution (LTE)/LTE-A wireless communication network technology to provide communication between base stations 105.

Figure 13:
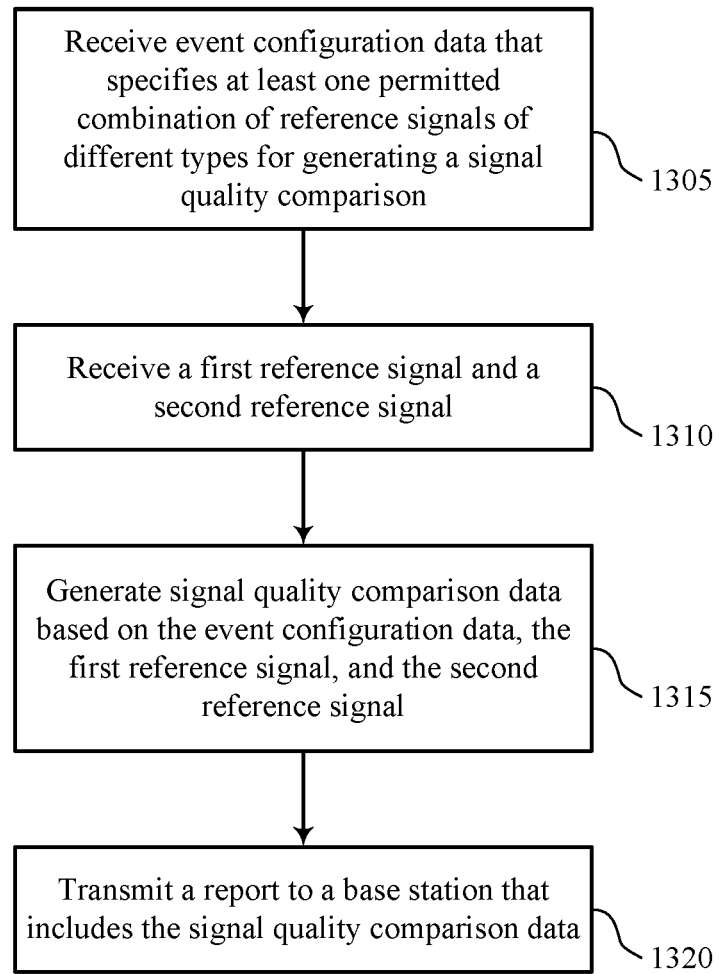
FIGS. 13 through 16 illustrate methods for event triggering and reporting with multiple reference signals in accordance with aspects of the present disclosure.

FIG. 13 shows a flowchart illustrating a method 1300 for event triggering and reporting with multiple reference signals in accordance with aspects of the present disclosure. The operations of method 1300 may be implemented by a UE 115 or its components as described herein. For example, the operations of method 1300 may be performed by a UE communications manager as described with reference to FIGS. 5 through 7. In some examples, a UE 115 may execute a set of codes to control the functional elements of the device to perform the functions described below. Additionally or alternatively, the UE 115 may perform aspects of the functions described below using special-purpose hardware.

At block 1305 the UE 115 may receive event configuration data that specifies at least one permitted combination of reference signals of different types for generating a signal quality comparison. The operations of block 1305 may be performed according to the methods described with reference to FIGS. 1 through 4. In certain examples, aspects of the operations of block 1305 may be performed by a configuration processor as described with reference to FIGS. 5 through 7.

At block 1310 the UE 115 may receive a first reference signal and a second reference signal. The operations of block 1310 may be performed according to the methods described with reference to FIGS. 1 through 4. In certain examples, aspects of the operations of block 1310 may be performed by a configuration processor as described with reference to FIGS. 5 through 7.

At block 1315 the UE 115 may generate signal quality comparison data based at least in part on the event configuration data, the first reference signal, and the second reference signal. The operations of block 1315 may be performed according to the methods described with reference to FIGS. 1 through 4. In certain examples, aspects of the operations of block 1315 may be performed by a comparison generator as described with reference to FIGS. 5 through 7.

At block 1320 the UE 115 may transmit a report to a base station that includes the signal quality comparison data. The operations of block 1320 may be performed according to the methods described with reference to FIGS. 1 through 4. In certain examples, aspects of the operations of block 1320 may be performed by a comparison generator as described with reference to FIGS. 5 through 7.

Figure 14:
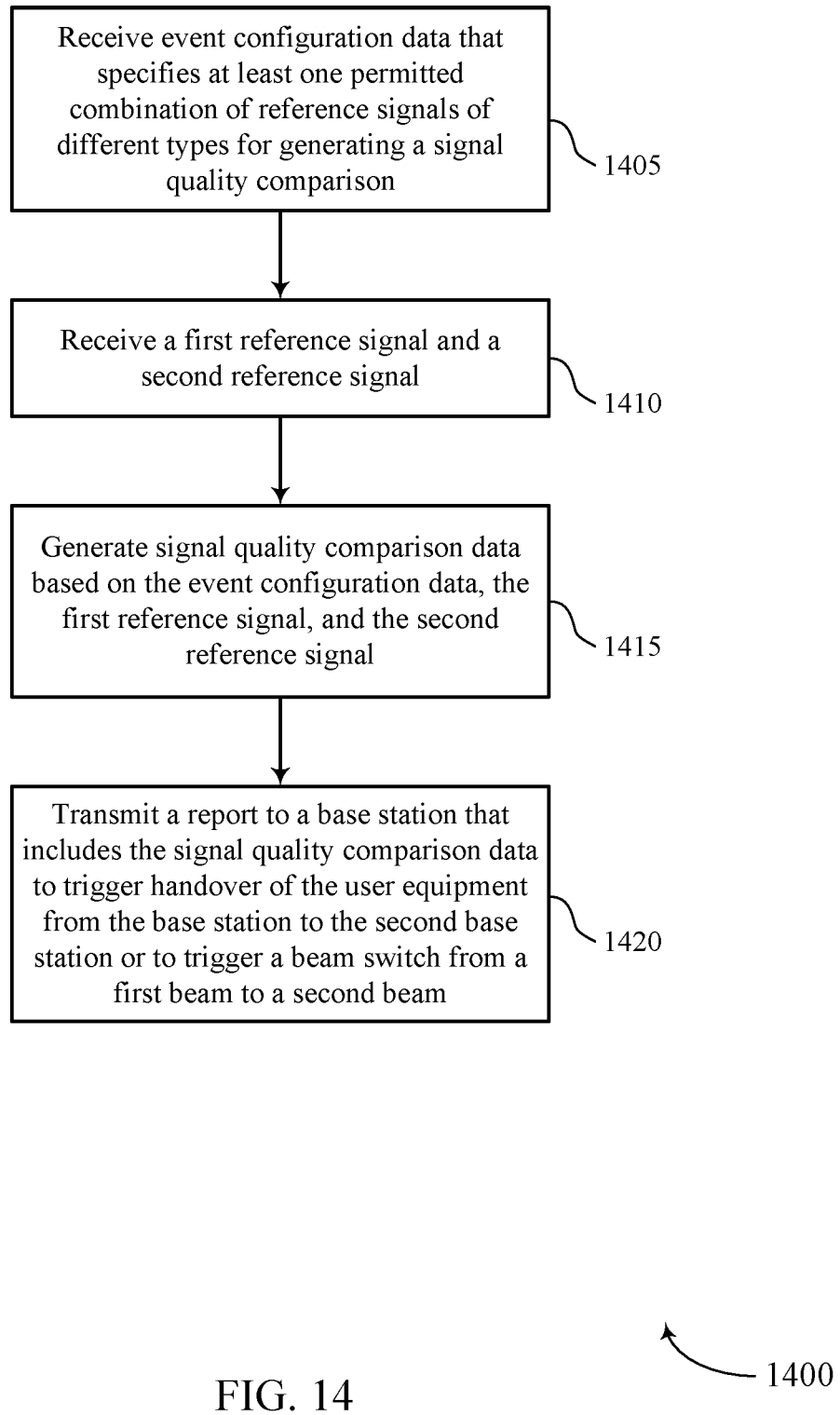

FIG. 14 shows a flowchart illustrating a method 1400 for event triggering and reporting with multiple reference signals in accordance with aspects of the present disclosure. The operations of method 1400 may be implemented by a UE 115 or its components as described herein. For example, the operations of method 1400 may be performed by a UE communications manager as described with reference to FIGS. 5 through 7. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may receive event configuration data that specifies at least one permitted combination of reference signals of different types for generating a signal quality comparison. The operations of block 1405 may be performed according to the methods described with reference to FIGS. 1 through 4. In certain examples, aspects of the operations of block 1405 may be performed by a configuration processor as described with reference to FIGS. 5 through 7.

At block 1410 the UE 115 may receive a first reference signal and a second reference signal. The operations of block 1410 may be performed according to the methods described with reference to FIGS. 1 through 4. In certain examples, aspects of the operations of block 1410 may be performed by a configuration processor as described with reference to FIGS. 5 through 7.

At block 1415 the UE 115 may generate signal quality comparison data based at least in part on the event configuration data, the first reference signal, and the second reference signal. The operations of block 1415 may be performed according to the methods described with reference to FIGS. 1 through 4. In certain examples, aspects of the operations of block 1415 may be performed by a comparison generator as described with reference to FIGS. 5 through 7.

At block 1420 the UE 115 may transmit a report to a base station that includes the signal quality comparison data to trigger handover of the UE 115 from the base station to the second base station or to trigger a beam switch of the UE 115 from a first beam to a second beam. The operations of block 1420 may be performed according to the methods described with reference to FIGS. 1 through 4. In certain examples, aspects of the operations of block 1420 may be performed by a comparison generator as described with reference to FIGS. 5 through 7.

Figure 15:
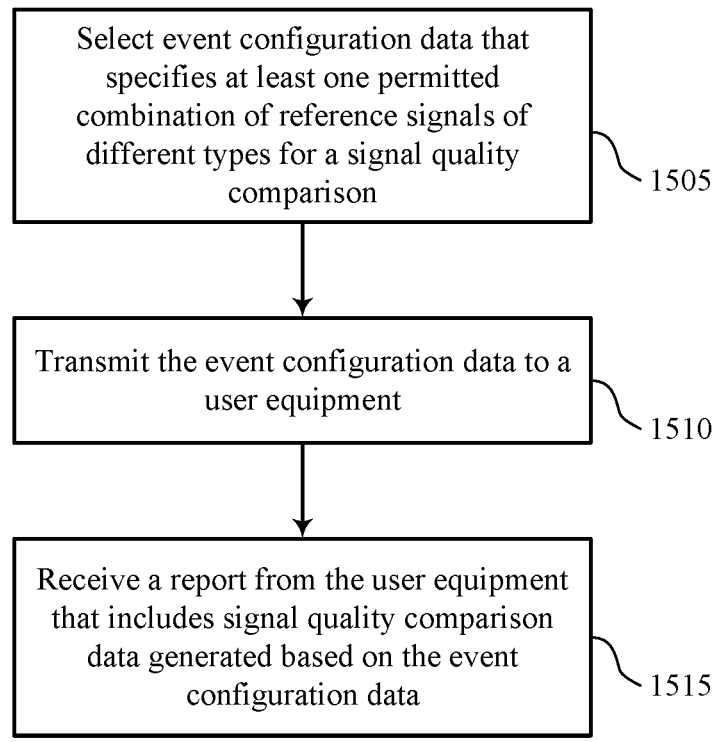

FIG. 15 shows a flowchart illustrating a method 1500 for event triggering and reporting with multiple reference signals in accordance with aspects of the present disclosure. The operations of method 1500 may be implemented by a base station 105 or its components as described herein. For example, the operations of method 1500 may be performed by a base station communications manager as described with reference to FIGS. 9 through 11. In some examples, a base station 105 may execute a set of codes to control the functional elements of the device to perform the functions described below. Additionally or alternatively, the base station 105 may perform aspects of the functions described below using special-purpose hardware.

At block 1505 the base station 105 may select event configuration data that specifies at least one permitted combination of reference signals of different types for a signal quality comparison. The operations of block 1505 may be performed according to the methods described with reference to FIGS. 1 through 4. In certain examples, aspects of the operations of block 1505 may be performed by a configuration selector as described with reference to FIGS. 9 through 11.

At block 1510 the base station 105 may transmit the event configuration data to a user equipment. The operations of block 1510 may be performed according to the methods described with reference to FIGS. 1 through 4. In certain examples, aspects of the operations of block 1510 may be performed by a configuration selector as described with reference to FIGS. 9 through 11.

At block 1515 the base station 105 may receive a report from the user equipment that includes signal quality comparison data generated based at least in part on the event configuration data. The operations of block 1515 may be performed according to the methods described with reference to FIGS. 1 through 4. In certain examples, aspects of the operations of block 1515 may be performed by a report processor as described with reference to FIGS. 9 through 11.

Figure 16:
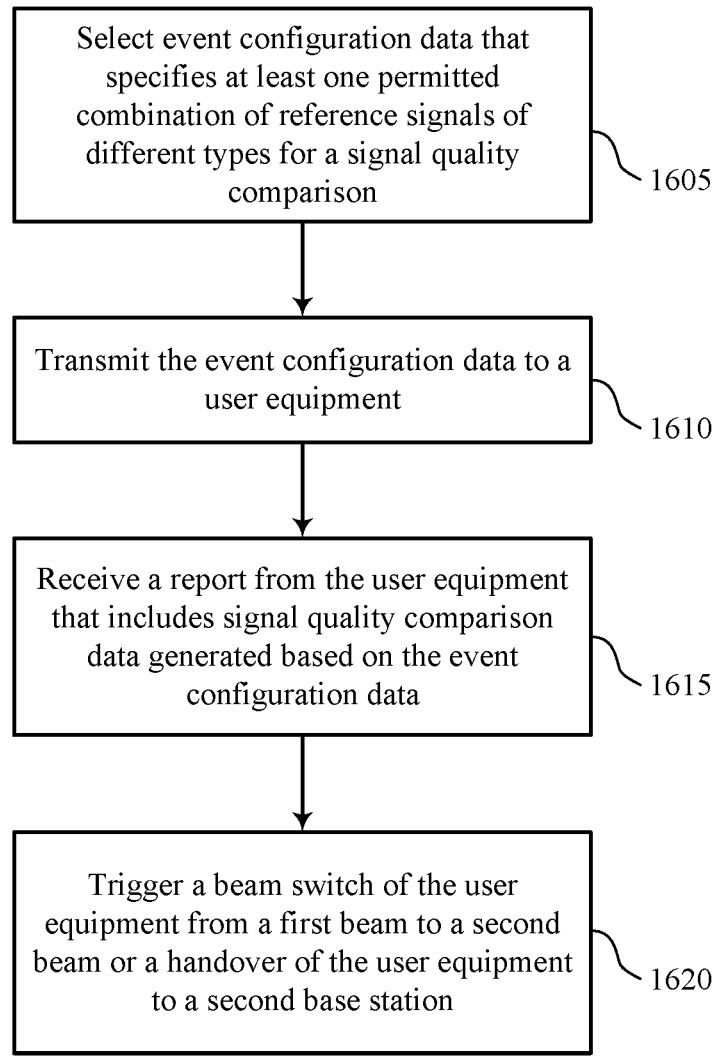

FIG. 16 shows a flowchart illustrating a method 1600 for event triggering and reporting with multiple reference signals in accordance with aspects of the present disclosure. The operations of method 1600 may be implemented by a base station 105 or its components as described herein. For example, the operations of method 1600 may be performed by a base station communications manager as described with reference to FIGS. 9 through 11. In some examples, a base station 105 may execute a set of codes to control the functional elements of the device to perform the functions described below. Additionally or alternatively, the base station 105 may perform aspects of the functions described below using special-purpose hardware.

At block 1605 the base station 105 may select event configuration data that specifies at least one permitted combination of reference signals of different types for a signal quality comparison. The operations of block 1605 may be performed according to the methods described with reference to FIGS. 1 through 4. In certain examples, aspects of the operations of block 1605 may be performed by a configuration selector as described with reference to FIGS. 9 through 11.

At block 1610 the base station 105 may transmit the event configuration data to a user equipment. The operations of block 1610 may be performed according to the methods described with reference to FIGS. 1 through 4. In certain examples, aspects of the operations of block 1610 may be performed by a configuration selector as described with reference to FIGS. 9 through 11.

At block 1615 the base station 105 may receive a report from a user equipment that includes signal quality comparison data generated based at least in part on the event configuration data. The operations of block 1615 may be performed according to the methods described with reference to FIGS. 1 through 4. In certain examples, aspects of the operations of block 1615 may be performed by a report processor as described with reference to FIGS. 9 through 11.

At block 1620 the base station 105 may trigger a beam switch of the user equipment from the first beam to the second beam or a handover of the user equipment from the base station 105 to a second base station. The operations of block 1620 may be performed according to the methods described with reference to FIGS. 1 through 4. In certain examples, aspects of the operations of block 1615 may be performed by a trigger component as described with reference to FIGS. 9 through 11.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a user equipment, comprising:

receiving event configuration data that specifies at least one permitted combination of reference signals of different types for generating a signal quality comparison;

processing the event configuration data to determine a margin for a first reference signal of a first reference signal type or a second reference signal of a second reference signal type different from the first reference signal type, wherein the margin is a function of bandwidth, or sub-carrier spacing, or both;

receiving, in a first beam, the first reference signal of the first reference signal type and receiving, in a second beam, the second reference signal of the second reference signal type different from the first reference signal type, wherein the first reference signal type and the second reference signal type correspond to a permitted combination of the at least one permitted combination specified by the received event configuration data, and wherein the first reference signal type is a synchronization type of reference signal;

generating signal quality comparison data based at least in part on the event configuration data, the margin, the first reference signal, and the second reference signal; and transmitting a report to a base station that includes the signal quality comparison data.

2. The method of claim 1, further comprising:
receiving a third reference signal; and
deriving a combined signal quality level based at least in part on the first reference signal and the third reference signal, wherein generating the signal quality comparison data is based at least in part on the combined signal quality level.

3. The method of claim 2, wherein deriving the combined signal quality level further comprises at least one of:
determining the combined signal quality level based at least in part on a function included in the event configuration data; or
determining the combined signal quality level using a predetermined number of reference signals identified in the event configuration data; or
determining the combined signal quality level using a reference signal that satisfies a threshold indicated in the event configuration data.

4. The method of claim 1, wherein generating the signal quality comparison data comprises:
comparing a first signal quality level associated with at least the first reference signal with a second signal quality level associated with at least the second reference signal.

5. The method of claim 1, wherein the first reference signal is transmitted by the base station and the second reference signal is transmitted by a second base station, and wherein transmitting the report is to trigger handover of the user equipment from the base station to the second base station.

6. The method of claim 1, wherein the first reference signal is associated with a first beam and the second reference signal is associated with a second beam, and wherein transmitting the report is to trigger beam switch of the user equipment from the first beam to the second beam.

7. The method of claim 6, wherein the first beam is transmitted by the base station and the second beam is transmitted by a second base station.

8. The method of claim 1, wherein the first reference signal, the second reference signal, or both, are a cell-specific reference signal or a user equipment-specific reference signal.

9. The method of claim 1, wherein the report comprises an identifier of at least the first reference signal and a signal quality level of at least the first reference signal, wherein the identifier includes a beam identifier, or a system frame number, or a subframe index, or a symbol index.

10. The method of claim 1, wherein the signal quality comparison is a relative signal quality comparison or an absolute signal quality comparison.

11. The method of claim 1, wherein the event configuration data includes a list of permitted combinations of reference signal types.

12. The method of claim 1, wherein receiving the event configuration data comprises:
processing radio resource control (RRC) signaling, layer 1 (L1) signaling, layer 2 (L2) signaling, or any combination thereof, to obtain the event configuration data; or
processing a synchronization signal block, or a control region, or a data region to obtain the event configuration data.

13. A method for wireless communication by a base station, comprising:
selecting event configuration data that specifies at least one permitted combination of reference signals including at least a synchronization signal and a reference signal different from the synchronization signal for a signal quality comparison;
determining a margin for a user equipment to use for the synchronization signal or the reference signal different from the synchronization signal, wherein the margin is a function of bandwidth, or a sub-carrier spacing, or both;
transmitting the event configuration data to the user equipment; and
receiving a report from the user equipment that includes signal quality comparison data, wherein the signal quality comparison data is based at least in part on the event configuration data, the margin, the synchronization signal, and the reference signal different from the synchronization signal.

14. The method of claim 13, further comprising:
transmitting a reference signal to the user equipment.

15. The method of claim 13, wherein the report comprises an identifier of at least a first reference signal and a signal quality level of at least the first reference signal, wherein the identifier includes a beam identifier, or a system frame number, or a subframe index, or a symbol index.

16. The method of claim 13, wherein the signal quality comparison data is a comparison of a first signal quality level of a first reference signal transmitted by the base station relative to a second signal quality level of a second reference signal transmitted by a second base station, and wherein the method further comprises:
triggering a handover of the user equipment from the base station to the second base station based at least in part on the report.

17. The method of claim 13, wherein the signal quality comparison data is a comparison of a first signal quality level of a first beam relative to a second signal quality level of a second beam, and wherein the method further comprises:
triggering a beam switch of the user equipment from the first beam to the second beam.

18. The method of claim 17, wherein the first beam is transmitted by the base station and the second beam is transmitted by a second base station.

19. The method of claim 13, further comprising:
identifying a neighboring base station and signal quality comparison data of the neighboring base station based at least in part on the report.

20. An apparatus for wireless communication by a user equipment, in a system comprising:
a processor;
memory in electronic communication with the processor; and
instructions stored in the memory and operable, when executed by the processor, to cause the apparatus to:

receive event configuration data that specifies at least one permitted combination of reference signals of different types for generating a signal quality comparison;

process the event configuration data to determine a margin for a first reference signal of a first reference signal type or a second reference signal of a second reference signal type different from the first reference signal type, wherein the margin is a function of bandwidth, or sub-carrier spacing, or both;

receive, in a first beam, the first reference signal of the first reference signal type and receive, in a second beam, the second reference signal of the second reference signal type different from the first reference signal type, wherein the first reference signal type and the second reference signal type correspond to a permitted combination of the at least one permitted combination specified by the event configuration data, and wherein the first reference signal type is a synchronization type of reference signal;

generate signal quality comparison data based at least in part on the event configuration data, the margin, the first reference signal, and the second reference signal; and transmit a report to a base station that includes the signal quality comparison data.

21. The apparatus of claim 20, wherein the instructions are further executable by the processor to:

receive a third reference signal; and derive a combined signal quality level based at least in part on the first reference signal and the third reference signal, wherein the signal quality comparison data is generated based at least in part on the combined signal quality level.

22. The apparatus of claim 21, wherein the instructions to derive the combined signal quality level are executable by the processor to:

determine the combined signal quality level based at least in part on a function included in the event configuration data; or determine the combined signal quality level using a predetermined number of reference signals identified in the event configuration data; or determine the combined signal quality level using a reference signal that satisfies a threshold indicated in the event configuration data.

23. The apparatus of claim 20, wherein the instructions to generate the signal quality comparison data are executable by the processor to:

compare a first signal quality level associated with at least the first reference signal with a second signal quality level associated with at least the second reference signal.

24. The apparatus of claim 20, wherein the instructions are further executable by the processor to:

process the event configuration data to determine a margin for the first reference signal or the second reference signal, wherein the margin is a function of bandwidth, or sub-carrier spacing, or both, and wherein the signal quality comparison data is generated based at least in part on the margin.

25. The apparatus of claim 20, wherein the first reference signal is transmitted by the base station and the second reference signal is transmitted by a second base station, and wherein the report is to trigger handover of the user equipment from the base station to the second base station.

26. The apparatus of claim 20, wherein the first reference signal is associated with a first beam and the second reference signal is associated with a second beam, and wherein the report is to trigger beam switch of the user equipment from the first beam to the second beam.

27. The apparatus of claim 20, wherein the report comprises an identifier of at least the first reference signal and a signal quality level of at least the first reference signal, and wherein the identifier includes a beam identifier, or a system frame number, or a subframe index, or a symbol index.

28. An apparatus for wireless communication, comprising:

means for receiving event configuration data that specifies at least one permitted combination of reference signals of different types for generating a signal quality comparison;

means for processing the event configuration data to determine a margin for a first reference signal of a first reference signal type or a second reference signal of a second reference signal type different from the first reference signal type, wherein the margin is a function of bandwidth, or sub-carrier spacing, or both;

means for receiving, in a first beam, the first reference signal of the first reference signal type and receiving, in a second beam, the second reference signal of the second reference signal type different from the first reference signal type, wherein the first reference signal type and the second reference signal type correspond to a permitted combination of the at least one permitted combination specified by the event configuration data, and wherein the first reference signal type is a synchronization type of reference signal;

means for generating signal quality comparison data based at least in part on the event configuration data, the margin, the first reference signal, and the second reference signal; and means for transmitting a report to a base station that includes the signal quality comparison data.

* * * * *